United States Patent [19]

Fields et al.

[11] 4,351,405

[45] Sep. 28, 1982

[54] HYBRID CAR WITH ELECTRIC AND HEAT ENGINE

[75] Inventors: Gerald M. Fields, Brentwood; Robert G. Metzner, Beverly Hills, both of Calif.

[73] Assignee: Hybricon Inc., North Hollywood, Calif.

[21] Appl. No.: 98,930

[22] Filed: Nov. 30, 1979

Related U.S. Application Data

[63] Continuation-in-part of Ser. No. 950,795, Oct. 12, 1978, abandoned, which is a continuation-in-part of Ser. No. 885,797, Mar. 13, 1978, abandoned.

[51] Int. Cl.³ .................. B60K 41/00; B60K 7/00
[52] U.S. Cl. .................... 180/65 A; 74/478;
  180/65 F; 290/19; 310/181; 318/139
[58] Field of Search ................ 180/65 R, 65 C, 65 A,
  180/65 F, 65 E, 60, 68.5, 315, 335; 290/16, 17,
  21, 9, 10, 13, 18, 19; 74/478; 310/181; 318/139

[56] References Cited

U.S. PATENT DOCUMENTS

| | | | |
|---|---|---|---|
| 676,965 | 6/1901 | Sachs | 318/139 |
| 1,311,542 | 7/1919 | Turbayne | 310/181 |
| 2,244,216 | 6/1941 | Pieper | 180/54 C |
| 3,454,122 | 5/1967 | Grady, Jr. | 180/65 R |
| 3,503,464 | 3/1970 | Yardney | 180/65 A |
| 3,533,484 | 10/1970 | Wood, Jr. | 180/65 A X |
| 3,623,568 | 11/1971 | Mori | 180/65 A |
| 3,650,345 | 3/1972 | Yardney | 180/65 A |
| 3,837,419 | 9/1974 | Nakamura | 180/65 C |
| 4,025,860 | 5/1977 | Shibata et al. | 318/139 X |
| 4,042,056 | 8/1977 | Horwinski | 180/65 A |
| 4,090,577 | 5/1978 | Moore | 180/54 C X |
| 4,180,138 | 12/1979 | Shea | 180/65 A |

FOREIGN PATENT DOCUMENTS

| | | | |
|---|---|---|---|
| 2434167 | 2/1976 | Fed. Rep. of Germany | 180/65 R |
| 747587 | 4/1956 | United Kingdom | 310/181 |

Primary Examiner—Richard A. Bertsch
Assistant Examiner—Milton L. Smith
Attorney, Agent, or Firm—Lyon & Lyon

[57] ABSTRACT

An apparatus for economical travel and minimization of atmospheric degradation by internal combustion exhaust products. A car which has, in combination, a heat engine driving a set of front wheels, storage batteries and an electric motor driving a set of rear wheels. There is also a system for selecting electric or heat engine drive either manually or automatically and a single accelerator for controlling either mode of drive. A battery charging system supplies a constant power charge rate. Battery charging power is derived from the electric motors acting as generators driven by the rear wheels while the vehicle is in heat engine drive, and the battery charging rate is selected by the operator. Also in combination is a regenerative braking system to recover expended energy in the form of vehicle motion and an overdrive system to increase vehicle speed in the electric drive mode by field weakening. Protective systems are included to prevent overcharge of the storage batteries and to provide safe closing at high speeds of the electric clutches connecting the electric motors to the rear wheels. Changeover from electric drive to heat engine drive is simplified by a changeover system, and excessive loading of the heat engine by the battery charging system is eliminated on hills and during acceleration by a hill and acceleration sensing system. The car is designed for low speed and stop and go driving powered by the electric motors while the heat engine may be used for high speed and long distance travel.

18 Claims, 37 Drawing Figures

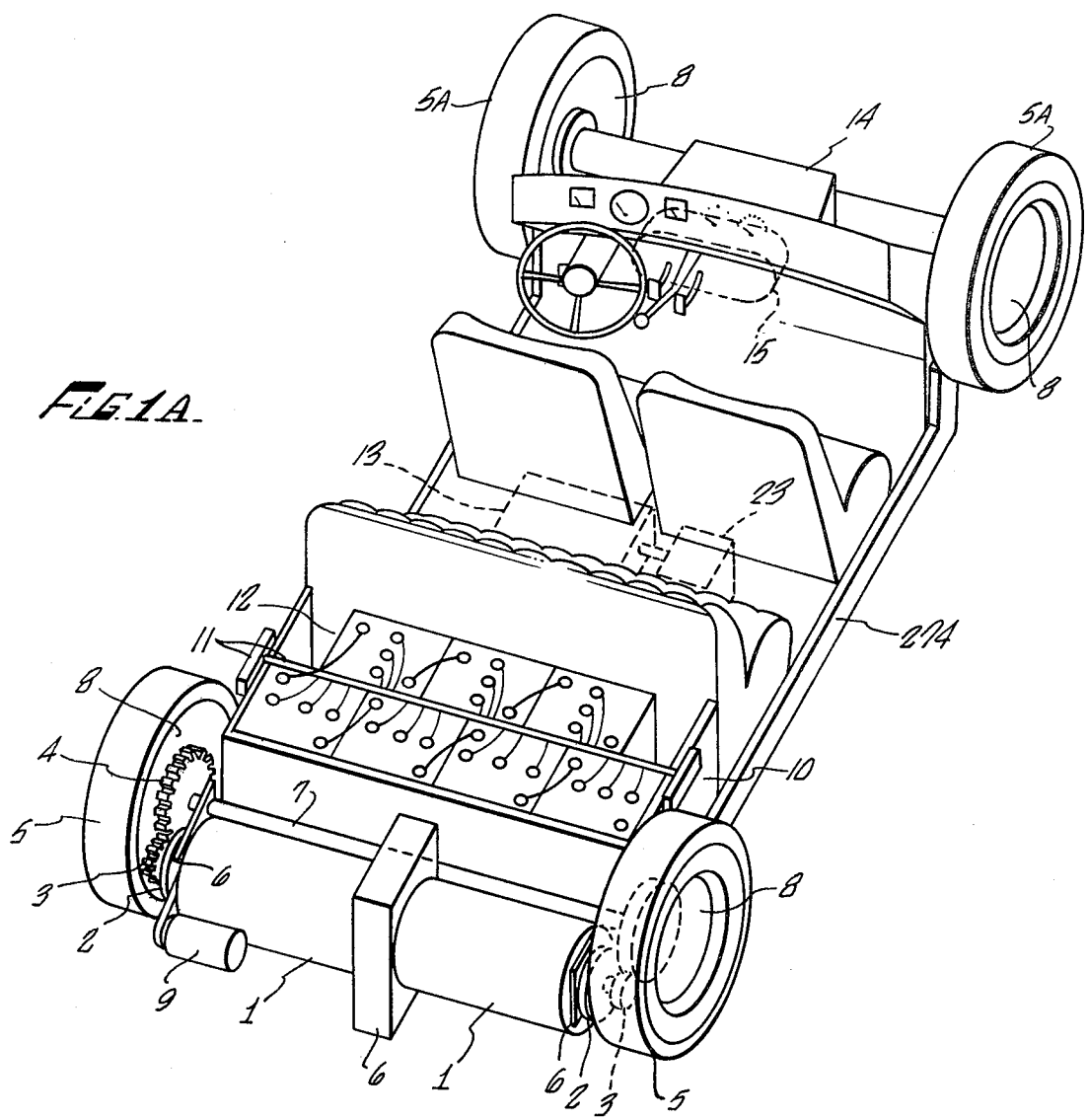
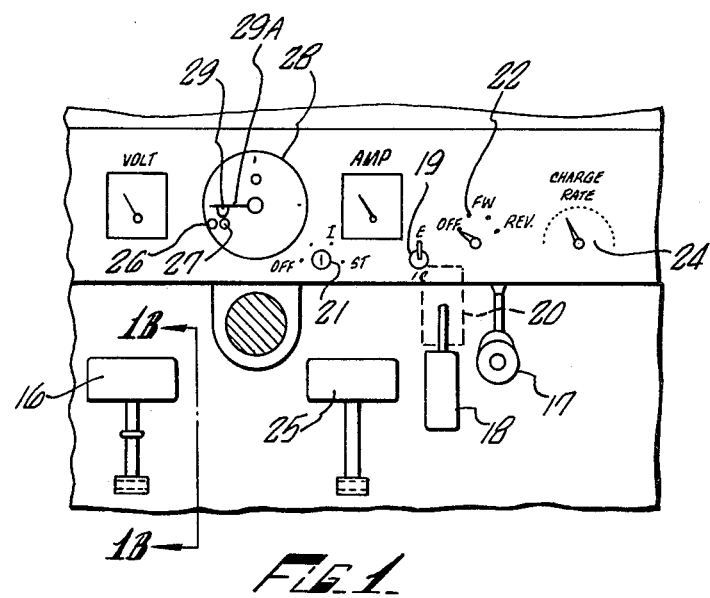
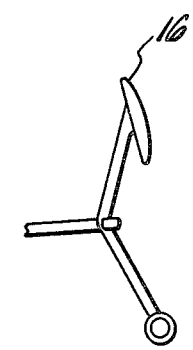

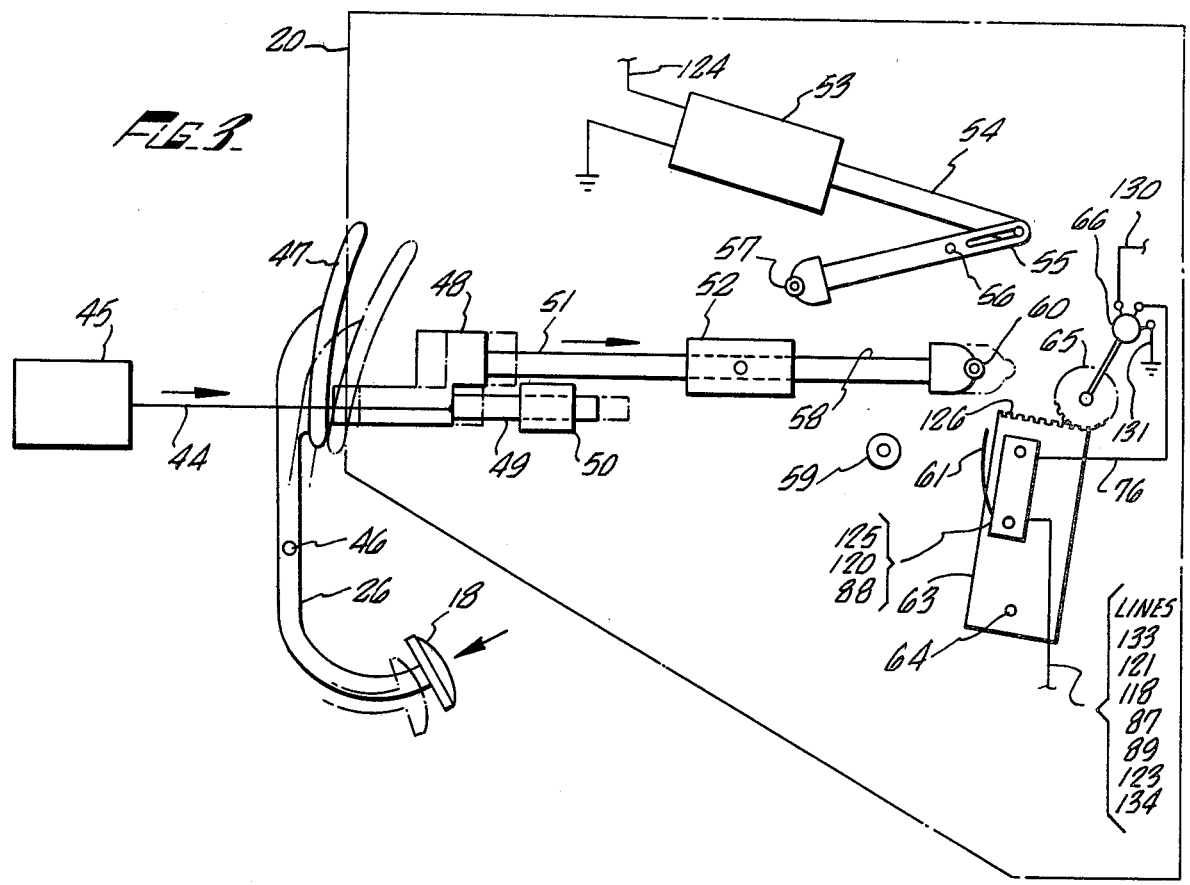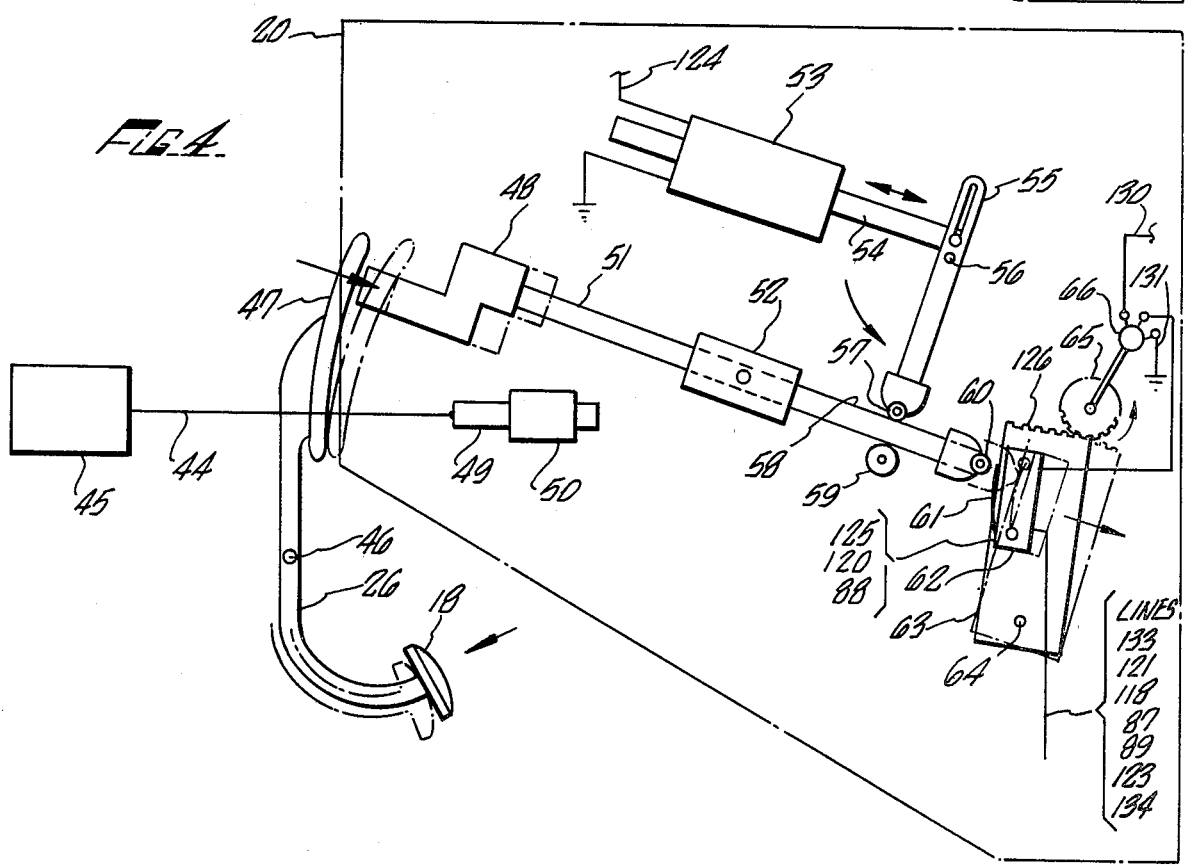

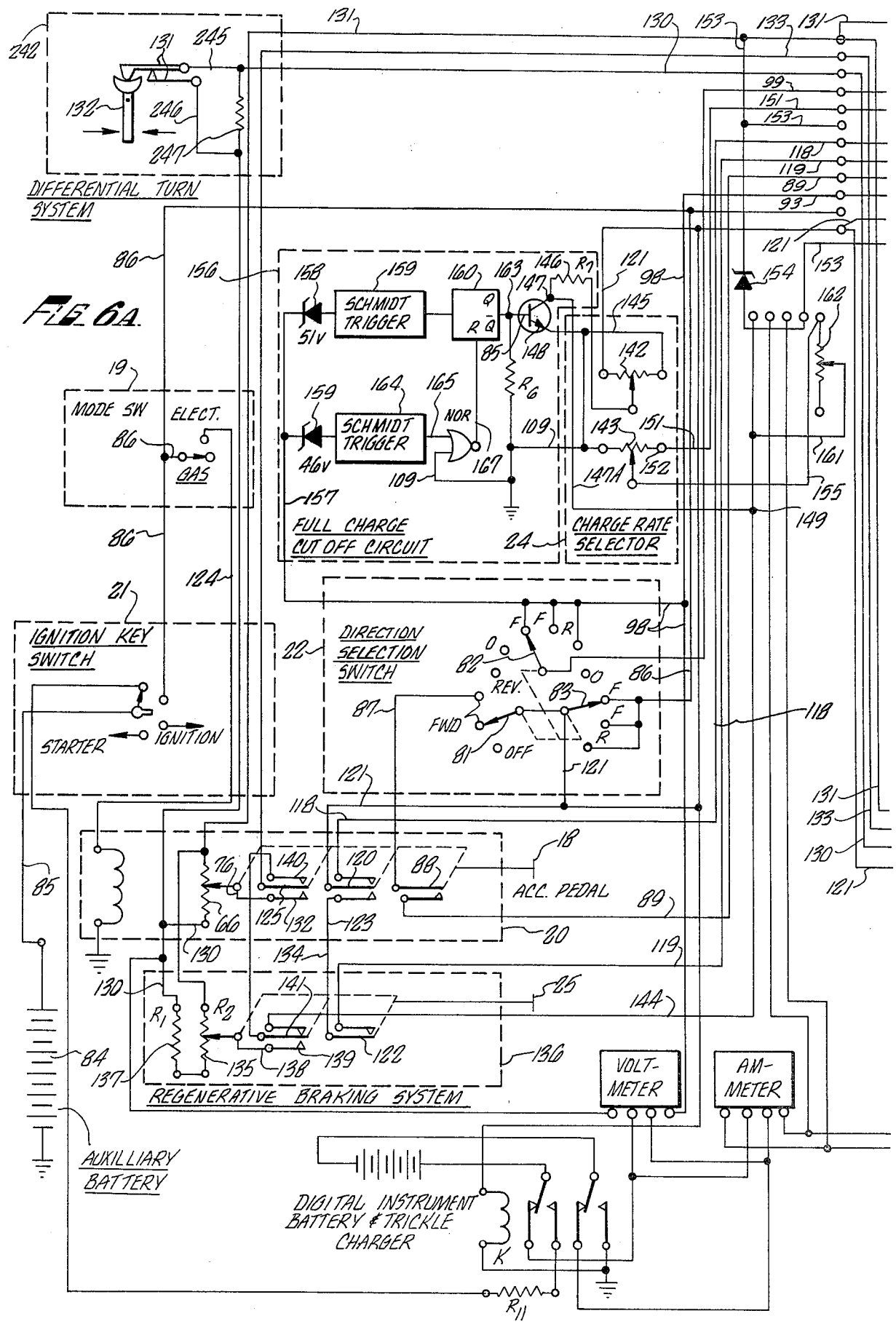

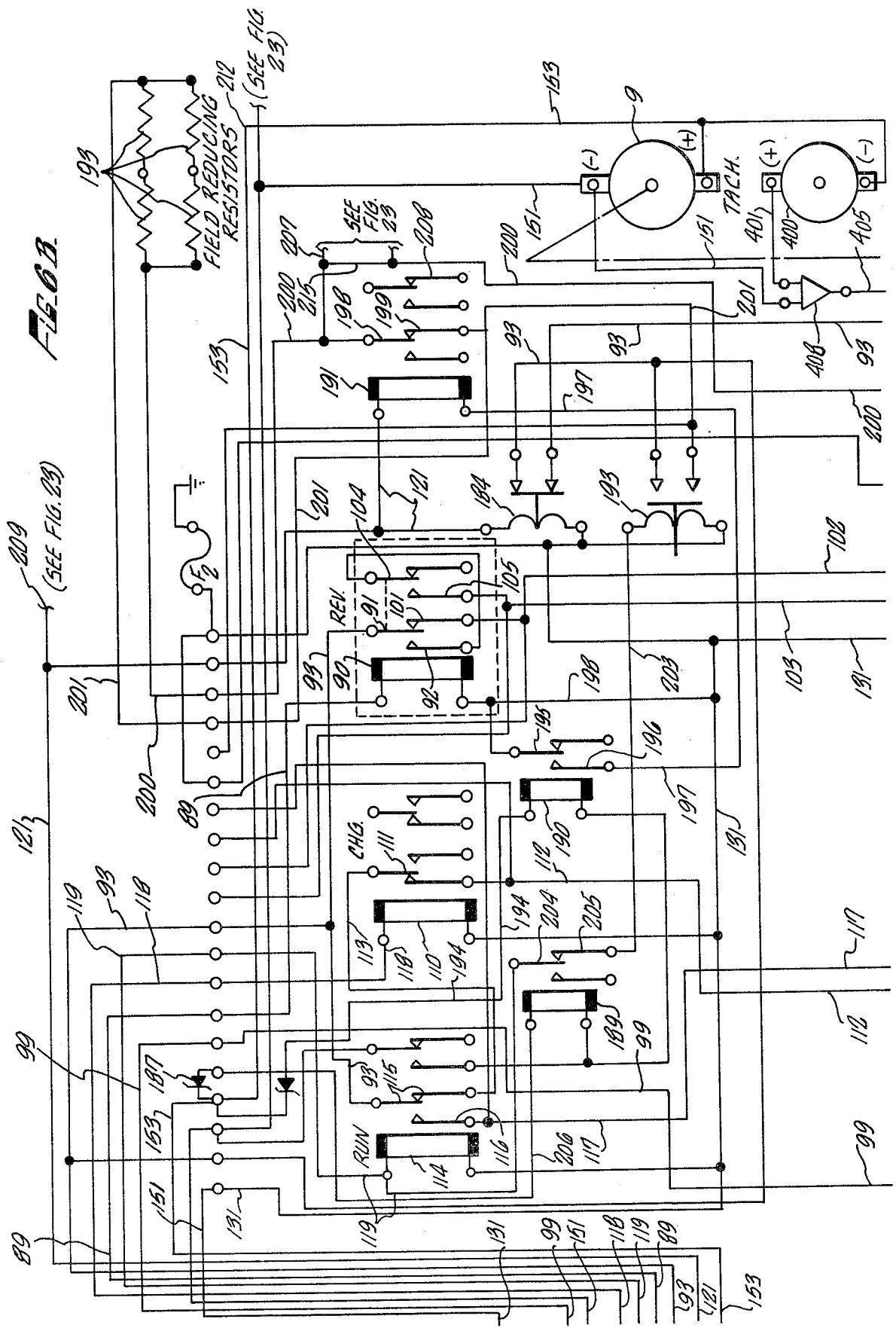

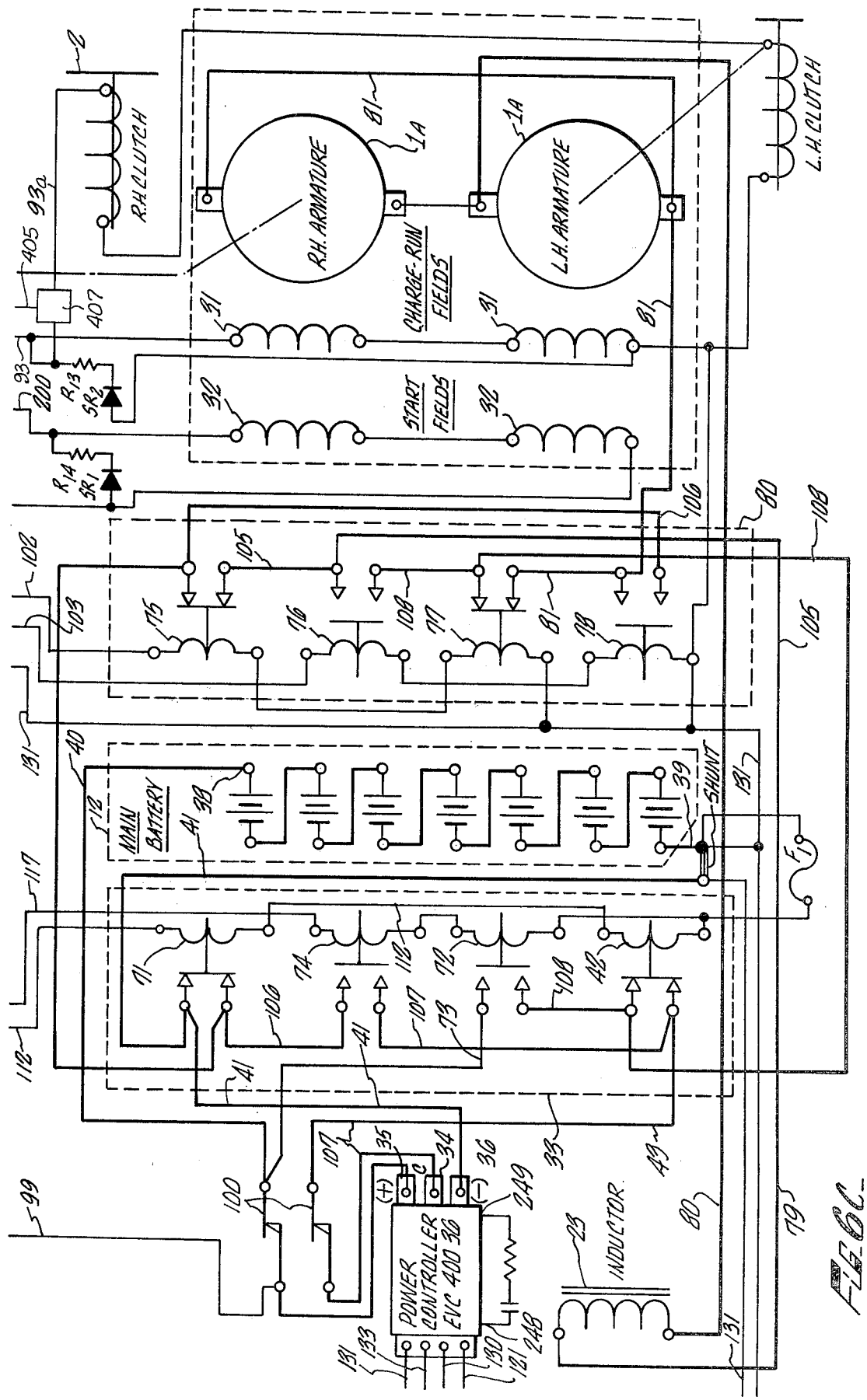

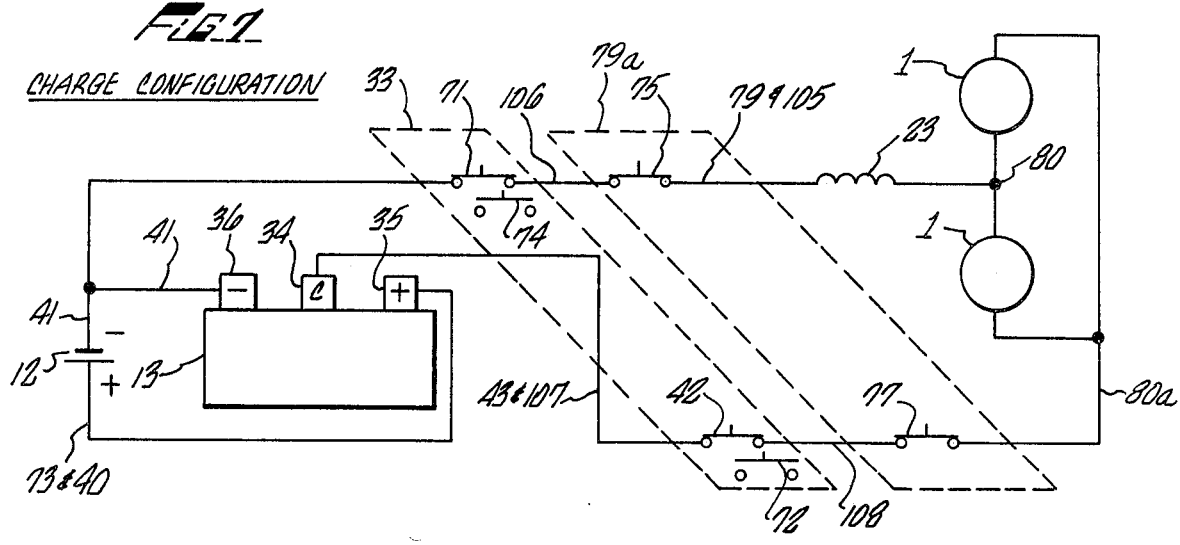
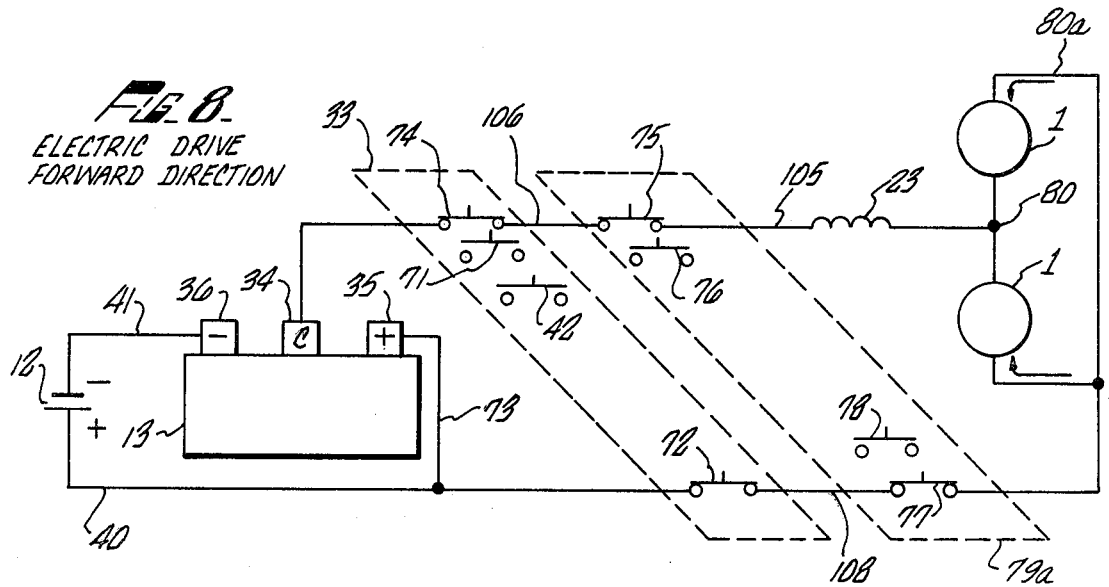
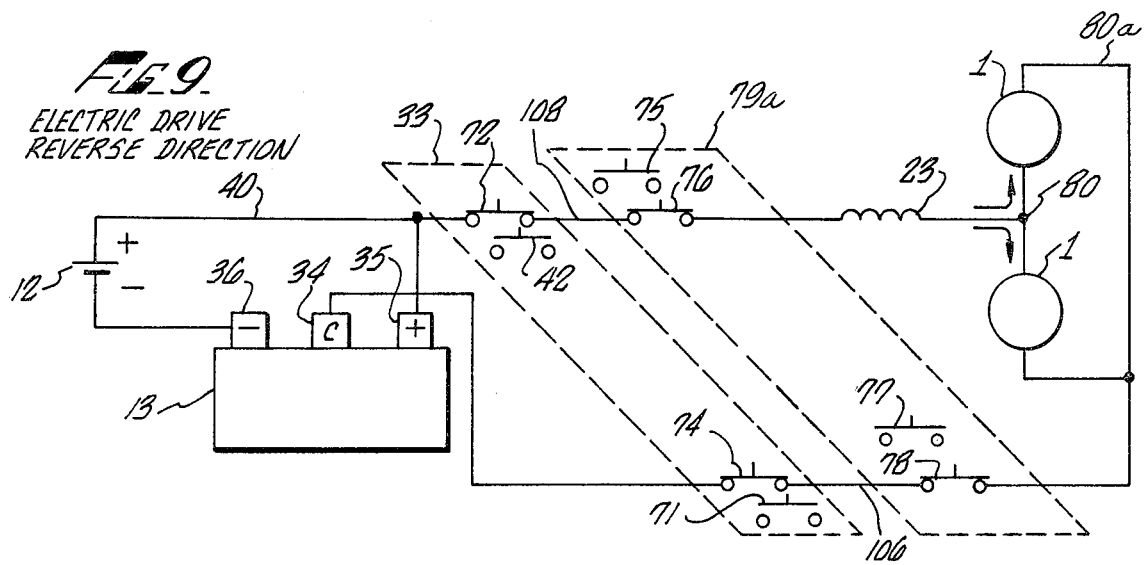

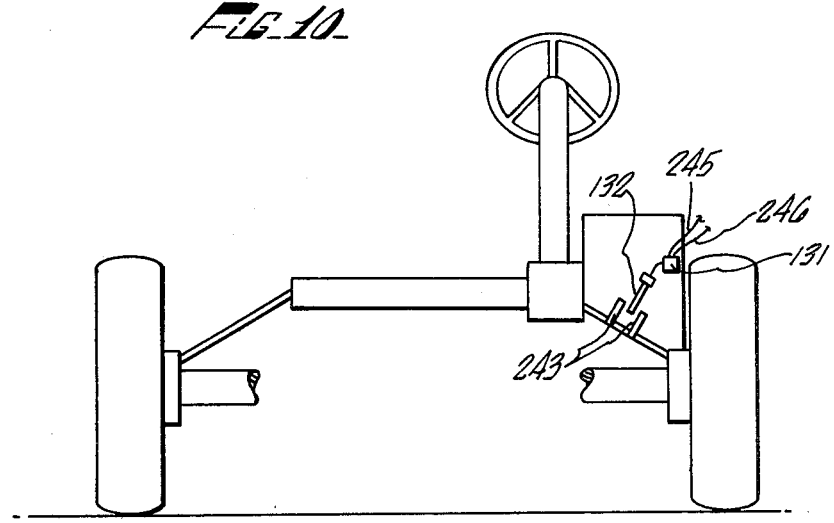
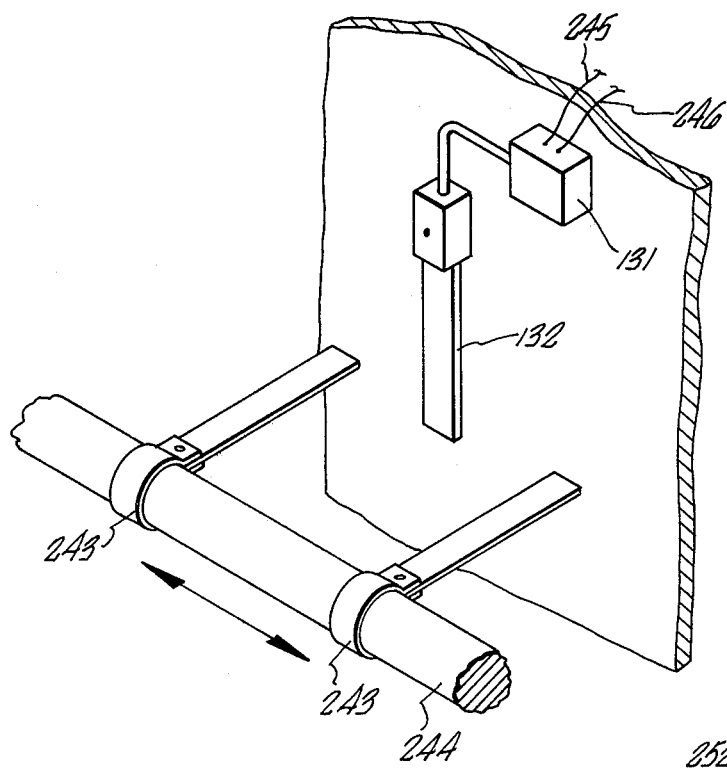
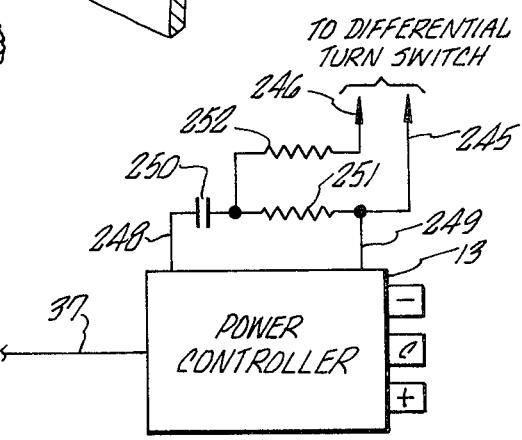

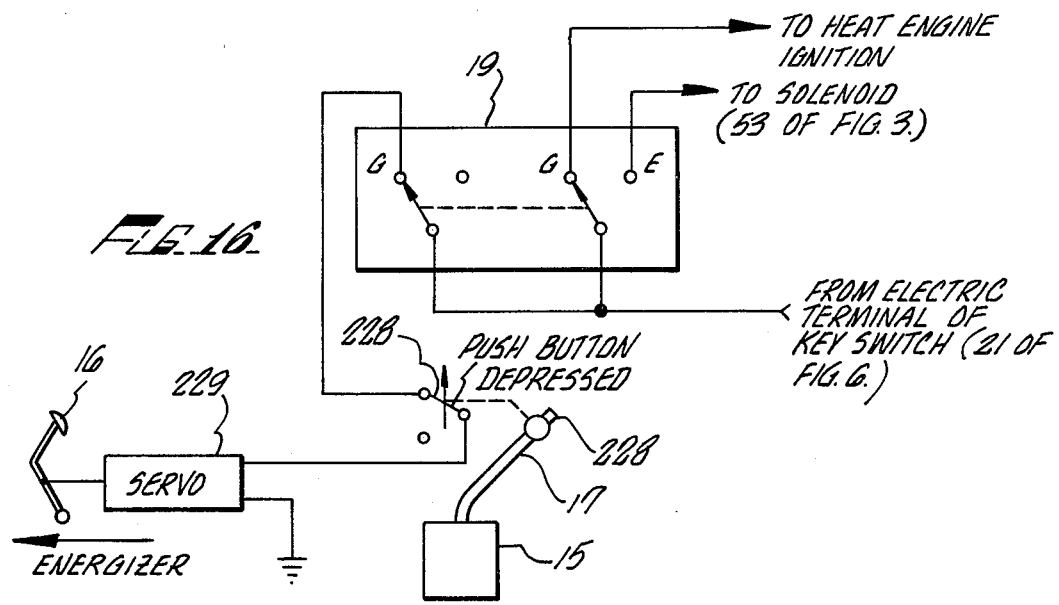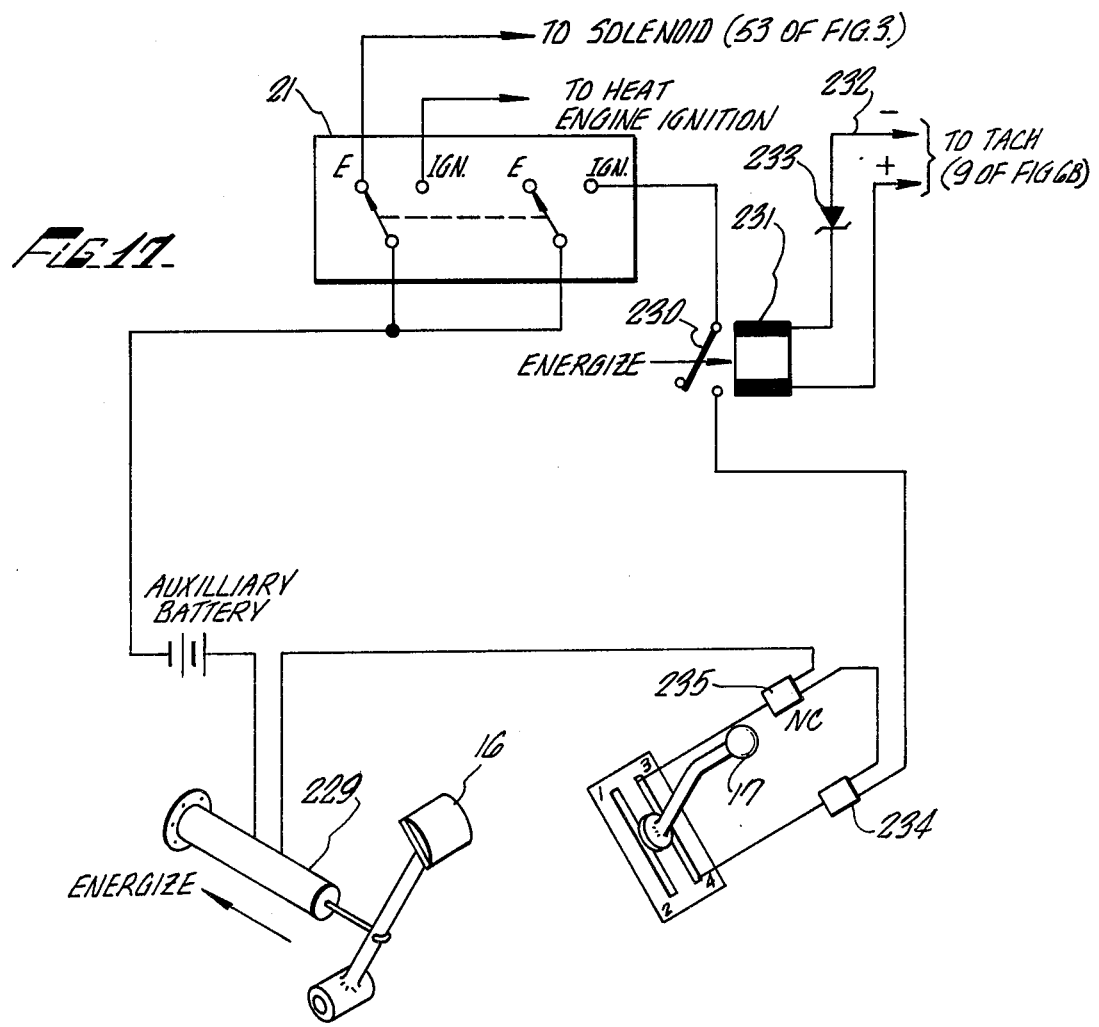

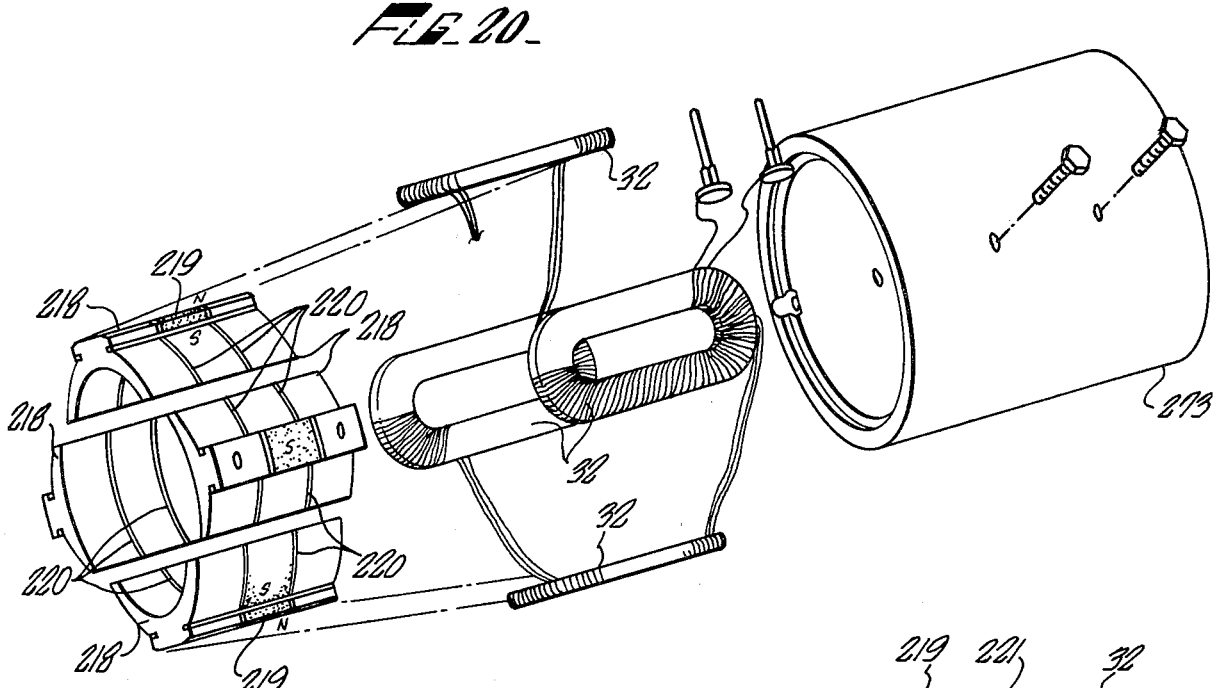
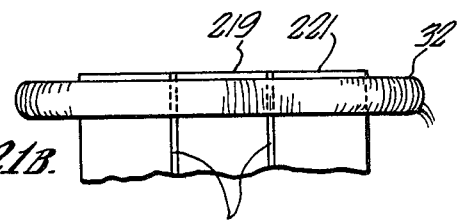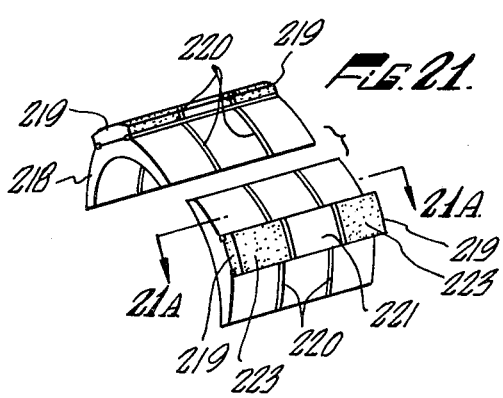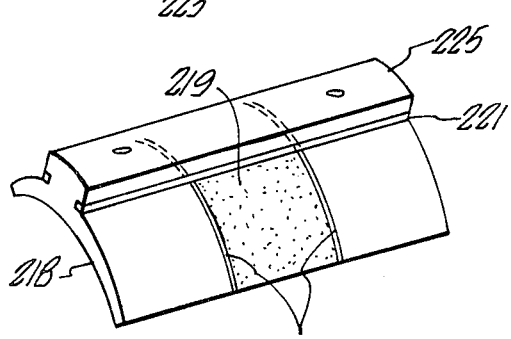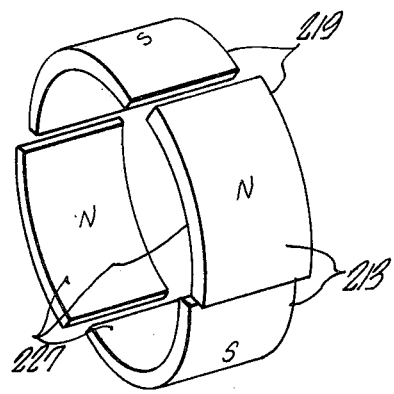

HYBRID CAR WITH ELECTRIC AND HEAT ENGINE

BACKGROUND OF THE INVENTION

1. Field of the Invention

The present application is a continuation-in-part of an earlier filed co-pending application entitled HYBRID CAR WITH ELECTRIC AND HEAT ENGINE, Ser. No. 950,795, filed Oct. 12, 1978, now abandoned, which was a continuation-in-part of an earlier filed application entitled HYBRID CAR WITH ELECTRIC AND HEAT ENGINE, Ser. No. 885,797, filed Mar. 13, 1978, now abandoned.

The present invention relates to the field of hybrid vehicles having both a heat engine and one or more electric motors for driving the vehicle. More particularly, an apparatus is taught adapted for economical and low exhaust emission travel by operator selection of either heat engine or electric drive. The operator may also select the constant power charge rate necessary to fully recharge the batteries in the estimated time that heat engine drive will be utilized.

2. Description of the Prior Art

Many attempts have been made in the prior art to devise hybrid vehicles utilizing both heat engines and electric motors; however, none of the known attempts allow operator selection of either battery powered electric motor drive or heat engine drive with recharging of the batteries at an operator selected constant power rate over a range of vehicle speed. Such an arrangement allows the charging power rate to be varied to give greater flexibility in recharging of the storage batteries during the estimated time the vehicle is to be driven in the heat engine mode. Further, none of the known prior art teaches a means for controlling vehicle speed in both modes utilizing a single accelerator pedal which is connected alternately to the heat engine fuel metering device or the means for controlling the power fed to the electric motor but not both simultaneously. Since the means for controlling power fed to the electric motor is also used to control the charging power rate, the single accelerator pedal arrangement allows independent control by the battery charging system of the means for controlling power while the single accelerator pedal is controlling the fuel metering device of the heat engine. Such an arrangement also allows the heat engine to idle while driving in the electric drive mode for rapid transition from electric drive to heat engine drive.

Further, none of the known prior art discloses the overcharge control system or the overdrive system disclosed herein. Finally, the high speed electric motor engagement and the details of the regenerative braking system also appear to be new as is the differential turn system and the changeover system.

For example, in Yardney, U.S. Pat. No. 3,503,464, a vehicle is driven by an electric motor fed by power from a generator. The generator is powered by a heat engine at high speeds. At low speeds, the Yardney car is driven by the same electric motor fed from batteries. Automatic changeover from battery power to generator power at a speed selected by the operator is taught. Speed in both modes is controlled by a single accelerator pedal which is always simultaneously connected to both the pulse width modulator controlling the electric motor speed and the fuel metering device for the heat engine. The voltage output from the generator varies in proportion to the heat engine speed such that depression of the accelerator pedal simultaneously increases the speed of the heat engine and the rate of power fed through the pulse width modulator to the electric motor. There is a storage battery in the Yardney car, but the charging power rate varies in proportion to the power output of the generator and no constant power rate could be selected by the operator. Further, there is no teaching of automatic cutoff of charging when the batteries are fully charged. Nor is charging power derived from the electric motors operating as generators driven by one set of wheels while the heat engine is driving another set of wheels.

The vehicle disclosed in Horwinski, U.S. Pat. No. 4,042,056 utilizes an electric motor driving one set of wheels with a heat engine driving another set. However, there the resemblance ends. The vehicle is designed to be driven primarily by the electric motor with the heat engine automatically starting when the vehicle reaches a predetermined speed in those circumstances where the battery is less than half charged.

The battery charging system of the Horwinski car is also different from the present invention. Horwinski recharges from electric power derived either from a battery charger plugged into an external source such as line current or from a separate electric generator drive by the heat engine. No system for charging at a constant rate of power is disclosed, nor is operator selection of the rate of charge disclosed.

No single accelerator system is disclosed which independently controls either the heat engine speed or the electric motor speed as selected by the operator. Nothing is disclosed in Horwinski regarding the structure used to accomplish the connections of the foot throttle to the heat engine and the electric motor control circuit to clarify whether the foot throttle is always simultaneously connected to both or selectively coupled to either. Further, speed control in electric drive is primarily accomplished by use of a hydraulically actuated, continuously variable ratio transmission, the ratio of the transmission being controlled by the foot throttle and associated relay circuitry.

In Pieper, U.S. Pat. No. 2,244,216, a vehicle is disclosed with a heat engine which could be connected to either front or rear wheels. An electric motor in the same power train is connected to the heat engine by a manual clutch or to the rear wheels by an electric clutch. The electric motor is driven either by battery power or by power from a generator driven by the heat engine. The batteries are recharged from energy derived from the electric motor when driven by the axle. There is no teaching of a single accelerator that controls either the heat engine mechanically and the electric motor electronically but not both simultaneously. Also, the rate of charging power is neither operator selected nor constant, and there is no teaching of an automatic cutoff of charging when the batteries are fully charged. Electric clutches are utilized to connect the electric motor to the driven wheels after a back EMF in the electric motor rises to a sufficient value to cut down starting current.

In Mori, U.S. Pat. No. 3,623,568, a heat engine, electric generator, and electric motor are all placed in the same power train to the wheels. The generator charges a storage battery and drives the electric motor. Mori maintains a constant current charge rate through a tachometer and control curcuit which measures the relative rotation of planetary gears connected to the armature and field of the generator and varies the field current accordingly. However, the rate of charge cannot be selected by the operator.

There is no teaching of separate drive of one set of wheels by one power source and another set of wheels by the other power source, and there is no teaching of a single accelerator device that could selectively control either the heat engine mechanically or the electric motor electronically. Motor speed is controlled by regulating motor field current and not armature current as in the present invention.

The vehicle taught in Grady, U.S. Pat. No. 3,454,122 discloses a regenerative braking system which utilizes a servo amplifier to control the field current in the electric motors. The regenerative braking transducer applies an error signal to the input of the servo amplifier which in turn increases the field flux in the electric motors. This increased flux causes an increased output voltage from the armature winding which exceeds the battery voltage. When this occurs, the direction of current flow in the motor armatures reverses and charging of the batteries occurs which results in increased mechanical load on the wheels driving the electric motors. The reversal of armature current cancels the error signal at the servo amplifier input.

Regenerative braking in the present invention is done differently. Regenerative braking occurs only when the accelerator pedal is undepressed in either heat engine drive or electric drive. In this condition, the control input of a "chopper" or pulse width modulator is connected to a transducer mechanically linked to the brake pedal. A control voltage which varies in proportion to braking pressure is applied to the control input. The "chopper" is connected to control power flowing between the battery and the electric motor in proportion to the signal at its control input. Increased braking pressure causes the "chopper" to change the pulse width or frequency or both of power passing through it from the electric motors to increase the average power flowing into the battery. The increased power translates into increased mechanical load on the rear wheels driving the electric motors.

There is also an inductor connected between the electric motor and the pulse width modulator of the present invention which steps up the output voltage from the armature. This step up causes the output voltage from the armature to exceed the battery voltage even at vehicle speeds below ten miles per hour. Accordingly, battery charging and regenerative braking can occur at very low vehicle speeds, an advantage not found in Grady as noted there at Col. 3, lines 58-60.

Grady also discloses a system to extend the range of speed control of the electric motors by switching the armatures of the motors from series to parallel connection across the battery as the vehicle exceeds a predetermined road speed.

The present invention increases the vehicle speed in an overdrive system utilizing a field weakening effect. Each electric motor may have at least two separately excitable field windings. All these field windings are energized when high torque is needed. However, when vehicle speed reaches a predetermined value, the current in one or more of the field windings in each motor is reduced. The reduction is accomplished in one embodiment by a relay connected to the output of a D.C. tachometer through a zener diode. The relay pulls in when the breakdown voltage of the zener is exceeded. The advantage of this arrangement lies in elimination of the necessity of switching high armature currents and the concomitant arcing and deterioration of switch contacts. Grady apparently discloses no means for prevention of such arcing.

Other U.S. patents of some relevance are: Papst, U.S. Pat. No. 3,211,249; Nims, U.S. Pat. No. 2,666,492; Matsukata, U.S. Pat. No. 3,502,165; Froelich, U.S. Pat. No. 1,824,014; Reinbeck, U.S. Pat. No. 3,888,325; and Kinashita, U.S. Pat. No. 3,970,163.

Thus, the prior art fails to fill the need for a dependable, low emission hybrid car capable of electrically powered, silent and non-polluting travel in the cities and high-speed, long-range travel powered by a small, low emission heat engine. Convenience and dependability have long been the nemesis of electric car builders. The low speed and short range of prior art electric cars has led to minimal consumer acceptance of them as a viable alternative to the noisy, gas guzzling standard auto. The inconvenience of being caught away from home with batteries down, and the long recharging times of prior cars have led to less than wholehearted acceptance by the public.

Attempts to devise an electric car capable of travel at highway speed have resulted in excessive battery weight. When heat engines were used to drive generators which in turn drove electric motors, noise, pollution, and inefficiency problems emerged.

Some prior art vehicles, such as Horwinski, used both a heat engine and an electric motor but provided for automatic changeover to or from the heat engine when predetermined criteria are met. Such an arrangement precludes operator selection of the desired power plant. Someday some communities may completely outlaw internal combustion engines to lower noise and pollution in which case operator selection would be desirable. Finally, quite often the prior vehicles utilized complicated and expensive transmissions linking the heat engine and electric motor to the same set of driven wheels.

The vehicle of the present invention is both lightweight and capable of high speed sustained travel. It is quiet and clean and can be recharged away from home merely by driving for a short time with the heat engine at an operator selected high rate of charge. Thus the possiblity of being marooned with dead batteries is eliminated. Because the rate of charge may be selected by the operator, recharging times can be relatively short. Complete flexibility in choice of power plant and charge rate is inherent in the design of the present invention. Finally, total gas mileage and pollution are improved by substantial use of electric drive, and complicated and expensive transmissions are eliminated by a separate pair of drive wheels for each power plant.

BRIEF SUMMARY OF THE INVENTION

The hybrid vehicle disclosed herein features operator selection of either mode of drive. Either heat engine drive of the front wheels or electric drive of the rear wheels can be selected. This system combines the speed and power advantages of an internal combustion engine with the economy and non-polluting nature of storage batteries and electric motor drive.

When high speed, long-range operation is necessary, or where the batteries are run down, or where front wheel drive is necessary, the heat engine mode can be selected. The main batteries are recharged by the electric motors acting as generators when the vehicle is in heat engine drive. When it is necessary to reduce air pollution, or where stop and go traffic is encountered, or where rear wheel drive is needed, electric drive can be selected. The electric drive mode is also available when fuel reserves for the heat engine are depleted.

Recharging of the main batteries is accomplished by a battery charging system featuring a substantially constant rate of power input over a range of vehicle speeds where the charging rate is selected by the operator. Charging at the selected rate over a wide range of vehicle speeds is made possible by an inductor which steps up the output voltage of the motor armatures to a voltage above that of the main battery even at low vehicle speeds. A power controller regulates the average power fed from the electric motors to the main batteries by "chopping" the power output of the motor armatures in accord with a control signal. The control signal is derived from a summing network which sums voltages representing the charging rate desired by the operator and the speed of the vehicle. The resultant control signal changes the pulse width or frequency or both of the armature output as the power output of the motors increases with increasing vehicle speed. The resultant, average power input to the batteries remains substantially constant.

A powerplant speed control system controls the speed of either the heat engine or the electric motors and controls switching of the power controller between its charging configuration and its electric drive configuration. A single accelerator pedal alternately controls either the heat engine or a speed control transducer controlling the power controller. Which power plant said single accelerator controls is selected by the operator with a dashboard mounted mode switch which in turn controls an electromechanical device. This electromechanical device physically changes the mechanical linkage of the accelerator pedal controlling the heat engine fuel metering device. A switch operated by the accelerator pedal controls a group of contactors which switch the power controller to its charging configuration. The charging configuration exists whenever the accelerator pedal is undepressed or the vehicle is in heat engine drive.

Mechanical braking is assisted by a regenerative braking system. When the accelerator pedal is undepressed or the vehicle is in heat engine drive and the brake pedal is depressed, the connections of the power controller will be changed to the charging configuration. Further, the control input will be connected to a transducer operated by the brake pedal. Increasing pressure on the brake pedal will increase the power fed from the power controller to the main battery. The energy absorbed by the battery comes from the kinetic energy of the vehicle converted to electricity by the wheel driven electric motors. Therefore, increased absorbed electrical energy is reflected in increased absorbed kinetic energy.

The main battery must be protected from overcharging. An overcharge control system stands ready to reduce the charging when the voltage of the main battery rises to a predetermined level. A transistor is connected as a switch to the output of the summing network of the battery charging system to ground the control signal at the control input of the power controller when the transistor is driven into saturation. When the main battery voltage rises to the predetermined level, a sufficient voltage is applied to the base of the transistor to drive it into saturation effectively grounding the control input of the power controller.

The maximum speed of electric motors is limited by the increasing counter E.M.F. generated in the motor at increasing rotational speed. Since the back E.M.F. is directly proportional to the strength of the magnetic field generated by the field windings, the maximum speed of the motors can be increased by reducing the current through the field windings. The overdrive system of the present invention performs this function. A D.C. tachometer mechanically connected to the armature of one of the electric motors produces a D.C. voltage proportional to armature speed. Each motor can have at least two separately excitable field windings—a start field and a charge-run field. The overdrive system controls current in the start field. Two zener diodes of differing breakdown voltages control two relays one of which causes insertion of a resistor in series with the start field reducing the current therein. The other relay causes a complete cut off of current through the start field.

The operator may inadvertently switch from heat engine drive to electric drive while the vehicle is travelling above the speed at which this transition may be safely made. If there were no high speed motor engagement system, when the operator switched the direction selection switch to either forward or reverse at high speeds the electrically operated clutches would attempt to connect the armatures of the electric motors to the rear wheels at substantially differential speeds. The inertia of the armatures would damage the clutches. To prevent this, a duel tachometer arrangement and a motor speed-up circuit is employed to cause the motor to approximate the speed of the wheel side of the clutch prior to engagement. Until the speed signals of the two tachs, one indicating wheel speed and one indicating motor speed, indicate similar relative speeds, the clutch engagement circuit is disabled. When proper speed conditions exist, the clutch may be activated.

When lead-acid storage batteries are charging they generate hydrogen which, if not removed, can accumulate in closed spaces and cause an explosion. To prevent this, a battery venting system is incorporated. A manifold collects the gases from each battery and vents them to outside the car. The manifold is assisted on one end by a ram air scoop and on the other, by a venturi shaped scoop.

When the vehicle turns, the different turning radii of the rear wheels causes the electric motors to turn at different speeds. Since both motors are being fed the same average power, undesirable loading effects are caused in the motor that is forced to turn slower than its armature current would have it turn. To reduce the stress on the motor armature caused by this effect, a differential turn system is employed which senses when the vehicle is turning and inserts a resistance in the circuit of the vehicle speed control system which lowers the voltage at the control input of the power controller. This cuts the average power fed to both motors during the turn and eliminates the undesirable stresses.

In changing from electric drive to heat engine drive while travelling the operator would be required to: move the ignition key switch from "electric" or "ignition", move the mode switch from "electric" to "gas", push in the mechanical clutch, put the transaxle in either third or fourth gear, and release the clutch. The changeover system reduces the number of steps in the operation. This system, in one embodiment, utilizes an electromechanical servo and interlocks with the tachometer and the gear shift lever. The servo disengages the mechanical clutch when the ignition key switch is turned to "ignition". If the gear shift lever is in the third or fourth gear position, the servo circuit is broken by the tachometer when travelling above a certain speed and the clutch pedal is released engaging the clutch and starting the heat engine.

The advantages and features of the present invention will become more apparent from the following description of embodiments thereof, taken in conjunction with the accompanying drawings.

BRIEF DESCRIPTION OF THE DRAWINGS

FIG. 1A is a perspective view of the whole vehicle;
FIG. 1 is a plan view of the dashboard and cockpit;
FIG. 1B is a side view of mechanical clutch 16 taken along line 1B of FIG. 1;
FIG. 3 is a drawing of the single accelerator mechanism in the heat engine drive mode;
FIG. 4 is a drawing of the single accelerator in the electric drive mode;
FIGS. 6A, B and C are pieces of the schematic diagram of the vehicle's electrical system;
FIG. 7 is a schematic diagram of the connection of the power controller in the charging configuration;
FIG. 8 is a schematic diagram of the connection of the power controller in the electric drive configuration in the forward direction;
FIG. 9 is a schematic diagram of the connections of the power controller in the electric drive configuration in the reverse direction;
FIG. 10 is a front view of the relative location of the differential turn switch relative to the steering mechanism;
FIG. 11 is a detailed drawing of the structure actuating the differential turn switch;
FIG. 12 is a schematic diagram of another embodiment of the differential turn system which changes the chopping frequency of the power controller;
FIG. 16 is a drawing of an embodiment of the changeover system;
FIG. 17 is a drawing of another embodiment of the changeover system;
FIG. 20 is an exploded view of an embodiment of the modified pole pieces and the start windings for use in the electric motors of the vehicle;
FIG. 21 is a view in perspective of the pole pieces as modified by replacement of one of the charge-run field windings by permanent magnets at both ends of each pole piece;

FIG. 21A is a sectional view of the pole piece of FIG. 21 as seen from section line 21A in FIG. 21;
FIG. 21B is a side view of another embodiment of the modified pole piece of FIG. 21 where the permanent magnet is placed in the center of the pole piece and showing the start field winding in position;
FIG. 22 is the preferred embodiment of the modified pole piece utilizing a cylindrically shaped permanent magnet;
FIG. 22A is a view of an embodiment of a segmented cylindrically shaped permanent magnet.

DETAILED DESCRIPTION OF THE PREFERRED EMBODIMENT

Figure 2:
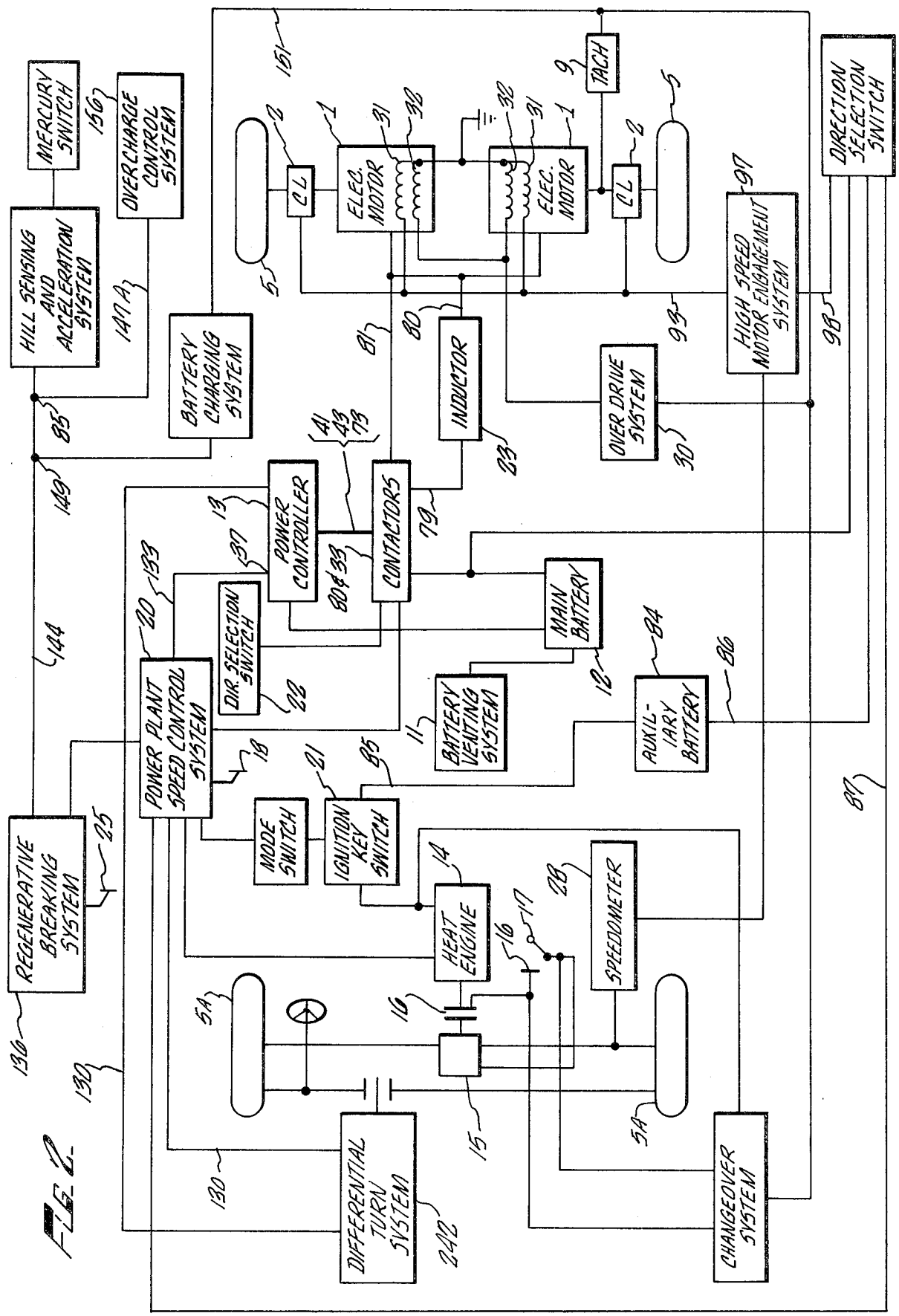
FIG. 2 is a block diagram of the various systems in the vehicle and their relationships with the other systems and devices in the car.

Referring now to FIGS. 1 and 1A, a chassis 274 supports electric motors 1 which are coupled through electrically operated clutches 2 to helical pinions 3 which engage gears 4 to drive rear axle 7 and rear wheels 5. The electric motors 1 are secured to chassis 274 by mountings 6. A battery frame 10 connected to chassis 274 holes main battery 12 comprised of several smaller batteries. Main battery 12 is vented by battery venting system 11. A power controller 13 is located under the vehicle in the airstream to control electric motors 1 and the charging rate of main battery 12. Power controller 13 is a "chopper" for controlling average power by varying both pulse width and frequency or pulse width alone. Inductor 23 is also placed in the airstream under the vehicle for cooling purposes. Inductor 23 and power controller 13 have several functions in the battery charging system, the regenerative braking system, and the propulsion system which will be explained subsequently. A tachometer 9 is coupled to the armature shaft of one of the motors and is a part of several of the control systems of the vehicle. Heat engine 14 is mounted on chassis 274 and is coupled to front wheels 5A through transaxle 15 and mechanical clutch 16. Shift lever 17 controls transaxle 15. Brake pedal 25 controls both a standard hydraulic or mechanical braking system connected to brake drums 8 and the regenerative braking system. Accelerator pedal 18 in conjunction with vehicle speed control system 20 controls the speed of either heat engine 14 or electric motors 1 depending upon the position of mode switch 19. In an alternative embodiment mode switch 19 may be placed on the top of shift lever 17. Ignition key switch 21 controls auxiliary battery 12A (not shown) and applies power therefrom to the vehicle control system in the "E" position, or to the heat engine ignition in the "I" position, or to the starter for the heat engine in the "ST" position. Speedometer 28 is equipped with a mask 29. Speedometer speed indicator 29A and mask 29 move so as to prevent light from light source 26 from reaching photoresister 27 at a low speed. Finally, charge rate selector 24 allows operator selection of the charging rate of main battery 12.

Figure 6:
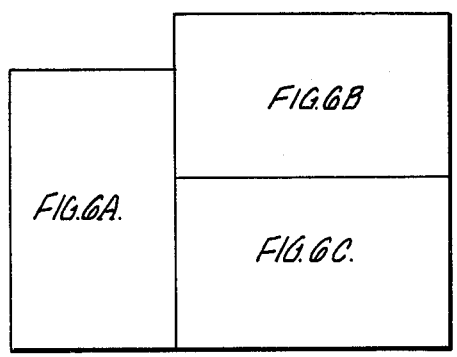
FIG. 6 is a diagram of the relationship of FIGS. 6A, B and C.

Referring now to FIGS. 2, 6 and 6C the structure and operation of the vehicle control systems will be discussed.

The vehicle can be powered either by heat engine 14 driving front wheels 5A through mechanical clutch 16 and transaxle 15 or by electric motors 1 driving rear wheels 5 through electrically operated clutches 2. The speed of heat engine 14 is controlled by a conventional fuel metering device such as a carburetor.

The speed of electric motors 1 is controlled by power controller 13 which functions to control the average power entering or leaving said electric motor 1 in accordance with a control signal applied to control input 37. Any conventional electronic controller or "chopper" may be used, but an EVC 400-36 pulse width modulator is used in the preferred embodiment.

The power controller 13 has a positive power terminal 35, a negative power terminal 36 and a chopped power terminal 34. The positive power terminal 35 is connected to the positive terminal 38 of the main battery 12 by line 40, and the negative power terminal is connected to the negative terminal 39 of main battery 12 by line 41. Chopped power terminal 34 is connected to contactor 42 by lines 107 and 43, negative power terminal 36 is connected to contactor 71 by line 41, and positive power terminal 35 is connected to contactor 72 by line 73. Contactors 71, 74, 72 and 42 are connected to contactors 75, 76, 77 and 78 and to inductor 23 and electric motors by a network of lines for purposes of rearranging the power controller-motor-inductor circuit. The exact manner in which the rearrangement is done will be explained subsequently, but, for now, suffice it to say that the purpose of the rearrangement is to reverse the direction of current in the armatures of electric motors 1 in electric drive and to convert from the electric drive mode to the battery charging mode.

Power controller 13 is connected to inductor 23 through the previously mentioned contactors by line 79. Inductor 23 is connected to the brushes on one side of the armature windings of electric motors 1 by line 80. The opposite side brushes are connected to contactor 78 by line 81. The function of power controller 13 is to control the average power entering or leaving armature windings 1A of electric motors 1. The average power is varied by chopping the battery voltage at positive and negative power terminals 35 and 36 into pulses of varying width or frequency or both at chopped power terminal 34 in proportion to the control signal at control input 37. Inductor 23 has the purpose of stepping up the output voltage from armature windings 1A for battery charging as will be explained subsequently.

Control of the direction of the vehicle in heat engine drive is accomplished by transaxle 15 and shift lever 17. In electric drive, however, control of vehicle direction is done by reversing the direction of the current flow in motor armatures 1A. Referring now to FIGS. 7 and 2 in addition to FIG. 6C, forward-reverse selection contactors 80, charge-run selection contactors 33, and direction selection switch 22 combine to cause this reversal. Direction selection switch 22 has four positions; starting from the extreme counterclockwise position they are: OFF, FWD, FWD, and REV. The three wipers 81, 82, and 83 each serve to control various devices which will be explained subsequently, but only wipers 81 and 83 function in direction control.

Referring now to FIGS. 6A, B and C, electric drive direction selection starts at auxiliary battery 84 which is connected by line 85 to ignition key switch 21. When this switch is in the ELECTRIC position, line 86 energizes three of the four terminals (FWD, FWD and REV) associated with wiper 83. Since wipers 81 and 83 are electrically connected together, wiper 81 is energized whenever ignition key switch 21 is in ELECTRIC and direction selection switch 22 is in either FWD position or REV. When in REV, wiper 81 energizes line 87 which energizes the wiper of switch 88 in the powerplant speed control system 20. The wiper of switch 88 is physically operated by accelerator pedal 18. When accelerator pedal 18 is depressed in the electric drive mode, switch 88 is closed and line 89 and the coil of relay 90 is energized. When relay 90 is energized, wiper 91 closes with contact 92.

Wiper 91 is connected to line 93 which is energized through line 98 through switch 22 when the contact 82 is in the forward or reverse position.

Wiper 82 is enegized by a positive 42 volts from main battery 12 by lines 99 and 40 through emergency switch 100. Emergency switch 100 disconnects main battery 12 from power controller 13 either manually or automatically when overload currents are sensed.

If direction selection switch 22 is in either FWD position or in REV, then wiper 91 of relay 90 will be energized along lines 98 and 93. When the coil of relay 90 is not energized because of the positions of accelerator pedal 18 or wiper 81, wiper 91 applies +42 volts to the coils of contactors 75 and 77 through contact 101 and line 102. These contactors put the circuit including main battery 12, power controller 13, inductor 23, and armature windings 1A in the FORWARD configuration shown in FIG. 8.

FIG. 8 and FIG. 9 show the arrangement of the electric motor drive circuit in the electric drive forward and electric drive reverse configuration respectively. In the electric drive reverse configuration, contacts 76 and 78 are energized by line 103 and closed and contactors 75 and 77 are open. This configuration corresponds to energization of relay 90 by line 89 causing wipers 91 and 104 to close with contacts 92 and 105 respectively.

Forward-reverse selection contactors 79a are ultimately controlled by the positions of accelerator pedal 18 and direction selection switch 22. When direction selector switch 22 is in either FWD position relay 90 is de-energized and contactors 75 and 77 are energized and closed, the contactors 76 and 78 are open. In this configuration, the lines involved in the electric motor drive circuit are as numbered on FIGS. 8 and 6C.

When direction selector switch 22 is placed in the REV position, relay 90 will be energized providing switch 88 is closed. Switch 88 will be closed only when accelerator pedal 18 is depressed and electric drive has been selected by mode switch 19. When relay 90 is energized, it closes contactors 76 and 78 and contactors 75 and 77 will open. This puts the vehicle in the electric drive reverse configuration and the connections will be as shown in FIGS. 9 and 6.

Note that in FIG. 8 current is flowing into armature winding 1A by line 81a whereas in FIG. 9 current is flowing into the armatures via line 80.

In both FIG. 8 and FIG. 9 current is being chopped between chopped power terminal 34 and negative power terminal 36. Also in both FIG. 8 and FIG. 9 contactors 72 and 74 are closed while contactors 71 and 42 are open. This condition indicates the vehicle is in the electric drive mode as opposed to the battery charging configuration.

The battery charging configuration, as shown in FIG. 7, occurs in two circumstances only: when the vehicle is in heat engine drive, and when the vehicle is in electric drive with accelerator pedal 18 undepressed. The latter condition represents the regenerative braking configuration. The charging configuration, as shown in FIG. 7, requires the closure of contacts 71, 42, 75 and 77. Contactors 71 and 42 are controlled by relay 110 through contacts 111 and line 112. Energization of contactors 71 and 42 requires that relay 110 be energized so that contacts 111 are closed, and that relay 114 be de-energized so that contacts 115 are closed. When such is the case, lines 93 and 98 from the contacts associated with wiper 82 of direction selection switch 22 will energize contactors 71 and 42 along lines 113 and 112 providing direction selection switch 22 is in any position other than "OFF."

As seen by the above description, relays 114 and 110 control whether the charge run selection contactors 33 (contactors 71, 74, 72 and 42) are in the CHARGE or RUN configuration. When relay 114 is energized, wiper 115 closes with contact 116 and line 93 then energizes and closes contactors 74 and 72 through line 117. This puts the vehicle in the electric drive or RUN configuration.

The energization of the coils of relays 114 and 110 is controlled by lines 119, 123 and 121 respectively. Lines 123 and 119 are energized by the wiper of switch 120 operated by accelerator pedal 18. Wiper 120 is energized by line 121 from wipers 81 and 83 of direction selection switch 22, and line 123 is energized when accelerator pedal 18 is depressed. Switch 122 opens when brake pedal 25 is depressed, and is a safety feature insuring that relay 114 cannot be energized by depression of accelerator pedal 18 when brake pedal 25 is depressed. Thus it is that when direction selector switch 22 is in either FWD position or in REV the vehicle is placed in the charge configuration when accelerator pedal 18 is undepressed and the run configuration when depressed assuming brake pedal 25 is undepressed in both cases.

Speed control of the vehicle in either electric drive or heat engine drive is accomplished by cooperation of accelerator pedal 18 and the power plant speed control system 20. Referring now to FIGS. 3, 4, 5 and 5A, a first embodiment of the power plant speed control system 20 operates as follows.

FIG. 3 shows the powerplant speed control system in the heat engine drive configuration. Cable 44 is always attached to heat engine fuel metering device 45 and controls it when the operator presses down on accelerator 18. By pivotal action around point 46 accelerator 18 moves upper arm 47 back against main arm extension 48. Main arm extension 48 pushes plunger 49 through aligning bushing 50, and cable 44 is attached to plunger 49. Main arm extension 48 is attached to main arm 51 which slides back and forth through sliding and pivoting bushing 52. The remaining components of the single accelerator are not in action in this mode.

In the electric drive mode shown in FIG. 4, solenoid 53 is energized by a signal from mode switch (19 in FIG. 6A) at a mode select input connected to line 124. Line 124 is energized when mode switch 19 is placed in the ELECTRIC position by virtue of the connection of the wiper of mode switch 19 to auxiliary battery 84 by lines 86 and 85 through ignition key switch 21. The activation of solenoid 53 pulls solenoid plunger 54 and solenoid arm 55 closer to solenoid 53. Solenoid arm 55 pivots at 56 allowing solenoid roller 57 to contact rack 58 and push it down to engage guiding means 59. When accelerator pedal 18 is depressed by the operator, upperarm 47 moves back pushing main arm extension 48 and main arm 51 toward movable arm 63 through sliding and pivoting bushing 52. Rack roller 60 attached to rack 58 of main arm 51 pushes against switch arm 61 operating the switches of block 62. Switch block 62 is comprised of switches 88, 120 and 125 shown on FIG. 6A. As main arm 51 moves further, rack roller 60 contacts movable arm 63. As the movable arm 63 moves around pivot 64, rack 126 rotates speed control gear 65 which operates speed control potentiometer 66.

Referring now to FIGS. 4 and 6A, speed control potentiometer 66 controls the speed of electric motors 1 by applying a varying control voltage to terminal 37 of power controller 13. Power controller 13 has a positive 12 volts impressed on terminal 128 along line 121 originating at wipers 81 and 83 of direction selection switch 22. Power controller 13 converts this positive 12 volts to a stabilized 5 volt supply at terminal 129 and this stabilized 5 volt supply is applied to one end of the element of speed control potentiometer 66 along line 130 through normally closed contacts 131 of differential turn switch 132. The wiper of speed control potentiometer 66 transmits a portion of the stabilized 5 volts along line 76 to contact 132 of interlock switch 125. When accelerator pedal 18 is depressed in the electric drive configuration of FIG. 4, the wiper of interlock switch 125 closes with contact 132, and the wiper of speed control potentiometer 66 is connected by lines 76 and 133 to control input 37 of power controller thereby enabling accelerator pedal 18 to influence the average power passing through power controller 13.

Figure 5:
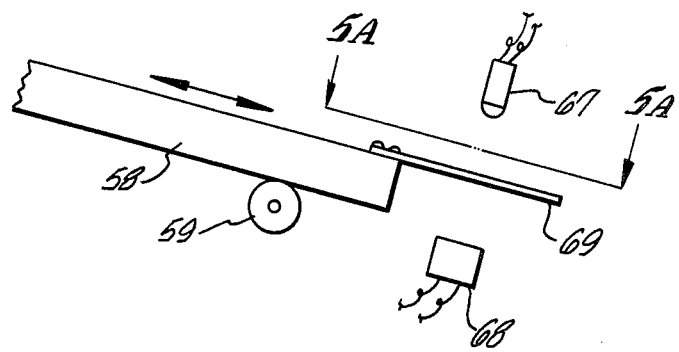
FIG. 5 is a drawing of another embodiment of the single accelerator.
Figure 5A:
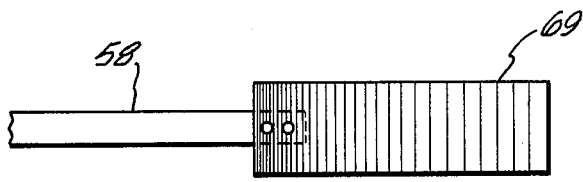
FIG. 5A is a plan view along lines 5A of FIG. 5.

Referring now to FIGS. 5 and 5A, an alternative embodiment of the powerplant speed control system is shown. In this embodiment, a gradient tint mask 69 is attached to the end of rack 58. FIG. 5A shows a plan view of gradient tint mask 69 seen as from section lines 5A. Light source 67 illuminates photoelectric cell 68 which changes its resistance with varying intensities of light passing through gradient tint mask 69. The intensity of light passing through the mask varies with the relative position of rack 58 to light source 67. Photoelectric cell 68 is used to control the control voltage at control input 37 of power controller 13 in FIG. 6C.

In order to recover electrical energy converted into the kinetic energy of motion for more efficient operation of the car, a regenerative braking system 136 is employed. A potentiometer 135 is mechanically actuated by brake pedal 25. One end of the element of potentiometer 135 is connected through a voltage dropping resistor 137 to the stabilized 5 volt supply at terminal 129 of power controller 13 by line 130. The wiper of potentiometer 135 is connected by line 138 to contact 139 of interlock switch 141 which switch is also operated by brake pedal 25. When brake pedal 25 is depressed, the wiper of interlock switch 141 closes with contact 139 transmitting the voltage on line 138 along line 134 to contact 140 of interlock switch 125. When accelerator pedal 18 is undepressed in the electric drive configuration of FIG. 4, or when powerplant speed control system 20 is in the heat engine drive configuration of FIG. 3, the wiper of interlock switch 125 will be in contact with contact 140. In this condition, potentiometer 135 will be controlling power controller 13 along line 133 to control input 37. Recall that switch 120 is ganged to interlock switch 125 and controls charge-run selection contactors 33, and switch 120 will have already placed these contactors in the charge configuration. Increasing pressure on brake pedal 25 will cause power controller 13 to change the average power in the pulse train of power passing from armature windings 1A to main battery 12. A greater average power input to main batteries 12 translates to increased mechanical drag on rear wheels 5 driving armature windings 1A. Much of the energy used in accelerating the vehicle is thus recovered and stored in the batteries.

The battery charging system employed in the vehicle features a constant rate of power input to main battery 12 with the rate of power input selected by the operator. Referring now to FIGS. 6A, B, and C, the charging rate is selected by manipulation of charge rate selector 24 as shown in FIG. 1. Charge rate selector 24 consists of two potentiometers 142 and 143 with ganged wipers to work in unison as the operator manipulates the charge rate selector knob. The two potentiometers are connected as a summing network with the output thereof being connected to control input 37 of power controller 13 by lines 144, interlock switch 141, line 134, interlock switch 125 and line 133. As can be seen from FIG. 6A, the output line 144 of charge rate selector 24 only controls power controller 13 when interlock switches 141 and 125 are closed. For this condition to exist, the brake pedal 25 must be undepressed and the accelerator pedal 18 must be undepressed or the powerplant speed control system 20 must be in the heat engine drive configuration. Whenever brake pedal 25 is depressed potentiometer 135 controls power controller 13 for regenerative braking by the operation of interlock switch 141.

Constant power charging at a rate selected by the operator allows flexibility in obtaining a full charge on main battery 12. The operator can minimize drag on the heat engine by setting the lowest charge rate necessary to bring the voltage of main battery 12 up to 52 volts during the time heat engine drive is to be used.

Constant power charging requires some means to vary the control signal to power controller 13 to compensate for increased power output from armature windings 1A as vehicle speed increases. Charge rate selector 24 and tachometer 9 combine to provide this compensation. Potentiometer 142 serves to set the rate of charging desired by the operator. One end of the element of potentiometer 142 is connected to the stabilized 5 volt power source at terminal 128 of power controller 13 by line 121. The other end of the element is returned to ground by line 145. The wiper of potentiometer 142 is connected through resistor 146 to collector 147 of overcharge control transistor 148. The function of resistor 146 and transistor 148 will be explained in conjunction with the discussion of the overcharge control system. Collector 148 is connected to summing junction 149 by line 150.

Potentiometer 143 provides compensation for vehicle speed by providing a negative offset voltage to summing junction 149. This negative offset voltage is derived by the action of potentiometer 143 in dividing off a portion of the speed proportional signal from tachometer 9. Tachometer 9 generates a D.C. voltage proportional to the rotational speed of one of the armature windings 1A. The negative terminal of tachometer 9 is connected to line 151 which is connected to terminal 152, which is the end of the element of potentiometer 143 opposite from the corresponding energized end of potentiometer 142. The other end of the element of potentiometer 142 is returned to ground by line 145. Likewise the positive terminal of tachometer 9 is returned to ground by line 153 through zener diode 154 which serves to prevent the application of the tachometer output to potentiometer 143 at low vehicle speeds thereby limiting the range of speeds through which constant power charging is employed. Therefore, as vehicle speed increases, terminal 152 becomes increasingly negative with respect to ground. The wiper of potentiometer 143 picks off a portion of this negative voltage and applies it to summing junction 149 through line 155. Variable resistor 156 adjusts the voltage at summing mode 149 to insure that the voltage there varies in proper inverse relation to the power output of said armature winding to maintain substantially constant power charging.

It is seen from the foregoing that when the operator sets charge rate selector 24 for a particular charge rate, the voltage at summing junction 149 will assume a certain positive voltage from zero to +5 volts. As vehicle speed increases, potentiometer 143 will apply an increasingly negative voltage to summing junction 149 through line 155 and variable resistor 162 and will drive the resulting voltage there toward zero. The voltage at summing junction 149 also appears at control input 37 of power controller 13 under the circumstances noted above. As the voltage at control input 37 becomes less positive, indicating increasing vehicle speed, the pulse width of the chopped waveform through power terminals 34, 35, and 36 becomes narrower. Because the output voltage from armature windings 1A increases with increasing vehicle speed, the narrower pulse width results in the same average power reaching main battery 12.

Inductor 23 in FIG. 6C plays an important role in both the battery charging and regenerative braking systems. Battery charging cannot occur until the output voltage of armature windings 1A exceeds the battery voltage. At low rotational speeds, the output voltage of the armature windings can fall below the battery voltage. Inductor 23 steps up the output voltage from armature windings 1A such that it is above the battery voltage over a wider range of vehicle speeds. Thus, substantially constant power battery charging and regenerative braking can occur even at very low vehicle speeds. In the electric drive mode, inductor 23 serves to increase the inductance of armature windings 1A as seen by power controller 13. A pulse width modulator of the type used in this vehicle will not operate into an inductance as low as armature windings 1A.

As the main battery 12 recharges, its voltage rises. To prevent overcharging and damage to the battery, an overcharge control system 156 senses the charging voltage and grounds the summing junction 149 when the charging voltage on main battery 12 rises above 51 volts. Line 157 of FIGS. 6A, B and C is connected to main battery 12 through wiper 82 of direction selection switch 22 and line 99. When the voltage on line 157 rises above a first breakdown voltage of 51 volts, first zener diode 158 breaks down and sends a trigger signal to first schmitt trigger 280 at trigger input 275. Schmitt trigger 280 then applies a pulse to a first input 276 of flip-flop 160 setting it in a first of its two stable states. The base 85 of transistor 148 serves as the overcharge input and is connected to one of the output of flip-flop 160 that goes "high" when first input 276 receives a pulse. Thus when first zener diode 158 breaks down, a signal is sent to the base of transistor 148 which is driven into saturation. Resistor 146 prevents excessive collector current from flowing in transistor 148. Transistor 148 controls the control signal at 37 in FIG. 6C by effectively grounding the wiper of potentiometer 142 of charge rate selector 24 thereby reducing the voltage at summing junction 149 to zero. This zero voltage at summing junction 149, when applied to control input 37, reduces the charging rate.

The same charging voltage which triggered first zener diode 158, also breaks down second zener diode 159 if the main battery voltage is over a second breakdown voltage of 46 volts. If second zener diode 159 is conducting, second schmitt trigger 164 is triggered by a second trigger signal from zener diode 159 at second trigger input 277. In this condition, a "high" or logic "1" exists at first input 165 of NOR gate 166. Since the second input of NOR gate 166 is always grounded by line 109, or held in a logic "0" or "low" state, the output 167 will not go "high" till input 165 goes "low." This occurs when the voltage on line 157 drops below 46 volts and second zener diode 159 drops out of conduction. The output of second schmidt trigger 164 will then go "low" causing NOR gate 166 to reset flip flop 160 by sending a reset signal to its reset input 168 setting said flip-flop in its second stable state. When flip-flop 160 is reset, output 163 goes "low", and transistor 148 drops out of saturation. Charging is then resumed until the voltage on line 157 again rises above 51 volts.

Figure 19:
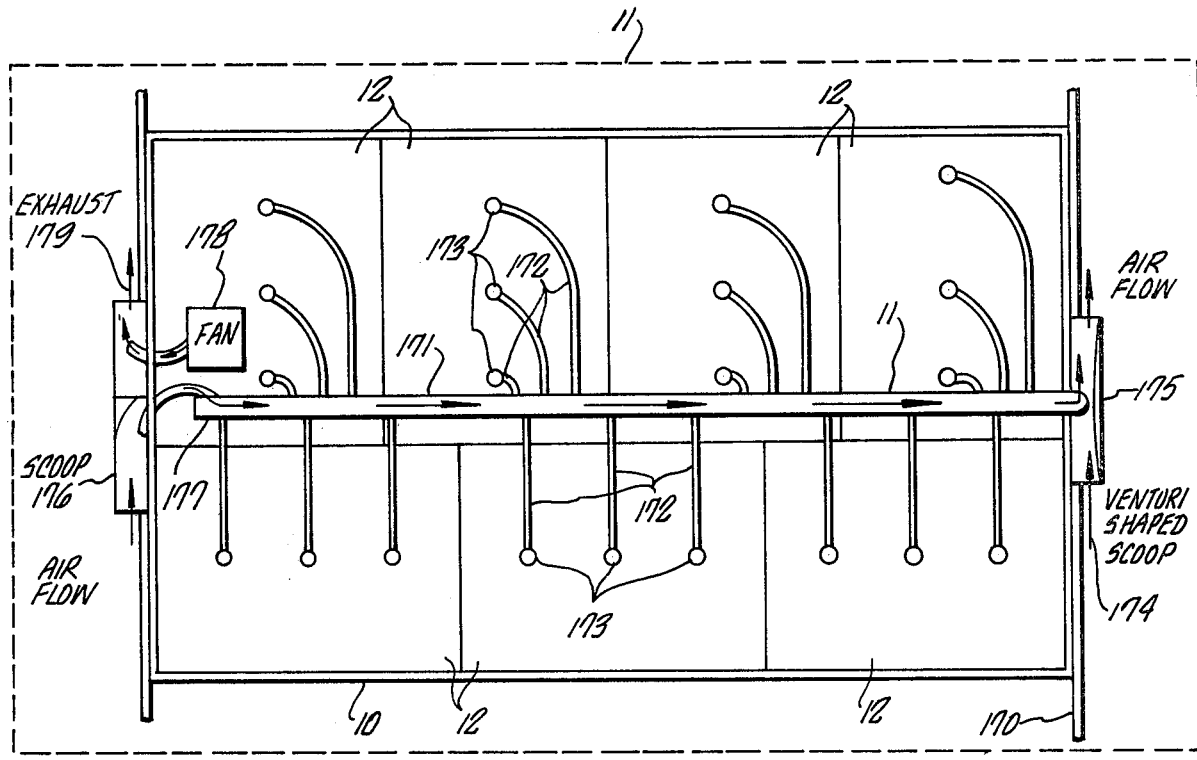
FIG. 19 is a detailed drawing of the battery venting system.

Main battery 12 generates hydrogen while charging as all lead-acid storage batteries do. If this hydrogen accumulates in any enclosed area it poses a danger of exploding. To prevent such accumulation, battery venting system 11 of FIGS. 1A, 2 and 19 provides ventilation for each battery of main battery 12. Referring now to FIG. 19, airtight battery compartment 10 holds the batteries comprising main battery 12 within the exterior walls 170 of the car. Collector tube 171 receives gases from hollow tubes 172 that are inserted into battery cells 173. Collector tube 171 is vented through the side of the car where venturi shaped scoop 174 helps suck out the gases by creating an area of low pressure at 175. Scoop 176 creates a ram air effect to push air into the collector tube thereby pushing the gases through collector tube 171. Collector tube 171 is higher at end 177 to help gases flow. Excess gases which are trapped in battery compartment 169 and not collected by the collector tube 171 and hollow tubes 172 are vented by fan 178 through exhaust outlet 179.

As mentioned above, protection is needed for electrically operated clutches 2 in FIG. 1A to prevent their destruction by sudden engagement with rapidly moving rear wheels 8. The same protection would be needed in an alternative embodiment with a mechanical clutch. This can be accomplished while the vehicle is running by turning the direction selection switch 22 to an on position and advancing the accelerator pedal 18 to energize and speed up the motors 1 to be a speed such that the clutches can be engaged between the motors and the wheels. The clutches will automatically engage at the appropriate relative motor speed by means of a relay 407. The relay 407 is activated by the combination of signals from tachometers 9 and 400. Tachometer 9 is coupled to one of the motors 1 to reflect the speed thereof. The tachometer 400 is coupled to one of the gears 4 by means of a pinion as can be seen in FIG. 1A. The tachometer 400 thereby reflects the speed of the vehicle. Other components of the motor drive train may be used to sense motor and vehicle speed. It is only required that speeds on either side of a clutch be registered.

The signals from the tachometers 9 and 400 are conveyed to a comparitor 408 by lines 151 and 401. Line 151 is connected to the negative pole of the tachometer 9 and line 401 is connected to the positive pole of the tachometer 400. The positive pole of the tachometer 9 is connected to the negative pole of the tachometer 400 by conductor 403.

The resulting signal from the comparitor 408 is transmitted to the relay 407 by line 405. Relay 407 controls power to the clutches through lines 93 and 93a.

Electric motors are limited in the maximum speed they can achieve by the back E.M.F. generated in the armature winding as it spins through the magnetic field created by the field windings. It is possible to increase the maximum speed of the motor by reducing the intensity of the magnetic field at high speeds. The overdrive system 30 of the vehicle disclosed herein does just that.

Referring now to FIGS. 2, 6A, B and C. overdrive system 186 is comprised of zener diodes 187 and 188, tachometer 9, relays 189 and 190, and 191, field reducing resistors 192, contactor 193, and start field windings 32. As shown in FIG. 6C, electric motors 1 each have, in the preferred embodiment, two separately excitable shunt wound field windings, the charge-run field winding 31 and start field winding 32. These two windings are needed to create a sufficiently intense stationary magnetic field to provide the high torques needed when accelerating the vehicle or when the vehicle is under heavy load. However, at higher speeds where torque requirements are not as high, the magnetic field produced by the start field is not needed and, in fact, is counterproductive.

Two steps of reduction of the intensity of the start winding magnetic field are employed. The first step in reduction occurs when the D.C. speed voltage from tachometer 9 on output line 153 rises above a first breakdown voltage level of a first zener diode 188. First zener diode 188 has a lower breakdown voltage than second zener diode 187. When first zener diode 188 begins to conduct, the voltage on line 153 as a first trigger signal is imposed upon the coil of relay 190 along line 194 and energizes relay 190 pulling wiper 195 into engagement with contact 196. When relay 190 is energized, the coil of relay 191 is grounded through contacts 195 and 196 along lines 197 and 198 to line 131 which is connected to the negative terminal of main battery 12. The coil of relay 191 is connected to auxiliary battery 84 through line 121, wiper 83 of direction switch 22, line 86, ignition key switch 21, and line 185. Consequently, when ignition key switch 21 is in the ELECTRIC position and direction selection switch 22 is in either the FWD or REV positions, relay 191 will be energized when the voltage from tachometer 9 rises to a first level representing a predetermined vehicle speed.

The effect of energization of relay 191 is to switch field reducing resistors 192 into the start field windings circuit in series with the windings the current flowing therein by removing the bypass path around resistors 192. The switching is done by wiper 198 and contact 199. Normally, current is fed to the start field windings 32 through line 93 and contactor 193. Recall that line 93 comes from terminals of direction selection switch 22 associated with wiper 82 through contacts 94 and 95 of high speed lockout circuit 97.

Assume for the moment that contactor 193 is always closed when the vehicle is in electric drive. When contactor 193 is closed the voltage on line 93 is transferred to line 201. Current is thereby forced to flow through start field windings 32 by way of contacts 198 and 199 and line 200. But when relay 191 is energized as detailed above, wiper 198 breaks contact with contact 199, and the current in line 201 is forced to travel through field reducing resistors 192 via lines 201 and 200 to and from these resistors. Contacts 198 and 199 merely bypass these resistors thereby decreasing the start field current and magnetic field intensity when they open.

The second step in field weakening occurs when the speed voltage from tachometer 9 rises still further and exceeds a second breakdown voltage level of zener diode 187. When this occurs relay 189 is energized via line 206 breaking the connection between contacts 204 and 205. The coil of contactor 193 is then de-energized. When contactor 193 is de-energized no current at all flows through start field windings 32 since the connection between lines 93 and 201 is broken. By this means the magnetic field generated by start field windings 32 is reduced to zero.

Figure 23:
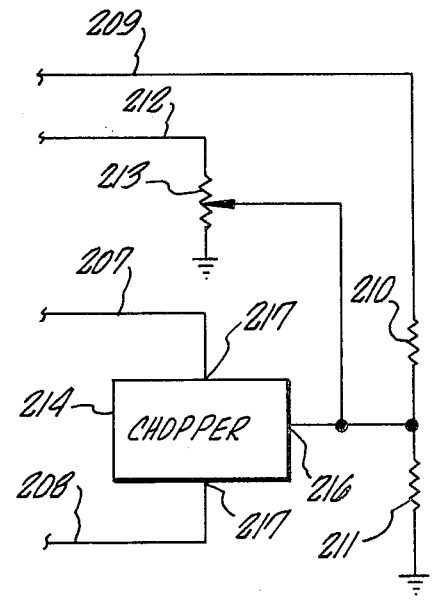
FIG. 23 is a block diagram of another embodiment of the overdrive system.

Alternatively, the magnetic field for the motors 1 could by generated by a single winding such as start field winding 32. This field could be reduced by use of a second "chopper" as shown in FIG. 23. The structure and operation of "chopper" 214 is well known to those skilled in the art and need not be detailed here. The "chopper" 214 controls the average power passing through the start field winding along line 200 by changing the pulse width or frequency or both of this signal. Line 200 is interrupted at point 215 in this embodiment and passes through the power terminals 217 of the "chopper" along lines 207 and 208. The power flowing through the power terminals is controlled by the control voltage at a second control input 216. This control voltage varies around a fixed bias level set by voltage divider resistors 210, 211. Potentiometer 213 applies a portion of the negative output voltage of tachometer 9 to control terminal 216 driving it more negative as vehicle speed increases. As the voltage at second control input 216 becomes more negative, the average power flowing through the start field winding becomes less and less and is finally reduced to a predetermined minimum at high speeds by zener diode 309. Although FIGS. 2 and 6C show electric motors 1 as having two separately excitable field windings, in another embodiment charge-run field winding 31 is replaced by a permanent magnet and chopper 214 can reduce voltage on field 32 to zero.

Alternatively a series field winding could be used for the start field winding 32 and the permanent magnet used to replace charge-run field winding 31. Such an arrangement would provide for the higher starting torques and regenerative braking efficiency of the series field arrangement. Simultaneously, it would eliminate the need for the old "teazer" connection used in the prior art to initiate regenerative braking in series wound D.C. machines that were switched from electric drive to a battery charging configuration with consequent decay of magnetic field during the switching interval. The permanent magnet eliminates the need for momentarily switching some current through the series field winding to initiate current flow in the armature winding—the function of the "teazer" connection. Since in the preferred embodiment some magnetic field is always present, electric motors 1 can be series wound D.C. machines with no additional requirement for a "teazer" connection in regenerative braking system 136.

Referring now to FIG. 20, the pole pieces 218 for start field winding 32 are shown with permanent magnets 219 inserted in the center of the pole piece. As shown in FIG. 21B, start field winding 32 fits around pole piece 218 as shown. Permanent magnet 219 may be any of the eight grades of ceramic magnets or a Crucore TM magnet manufactured by Crucible Steel Company. The Crucore TM magnet is preferred because of its superior strength. The magnetic properties and chemical compositions of both the ceramic and Crucore TM magnets are specified in the Magnetic Materials Producers Association Standards. Permanent magnets 219 replace charge-run field winding 31 thereby saving the electrical energy formerly needed to create the charge-run magnetic field and increasing the overall energy efficiency of the car by 14%, i.e., 7% in the electric drive mode and 7% in the charging mode.

Figure 22B:
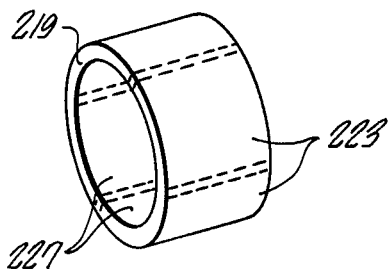
FIG. 22B is a view of another embodiment of the cylindrically shaped permanent magnet magnetized in sections.

Permanent magnets 219 can be rectangular as shown in FIGS. 22, 22A and 22B. In either case, the magnetic flux lines leave the large faces (223 in FIG. 21) of the magnets generally perpendicular to the surfaces of these large faces. The opposing large faces of each permanent magnet 219 are of opposite magnetic polarity.

FIG. 21 is a closeup view in perspective of another embodiment of the modified pole pieces with permanent magnets 219 inserted in the ends of pole pieces 218. FIG. 21A is a side view of pole piece 218 seen from line 21A in FIG. 21. Non-magnetic shields 220 separate the permanent magnets 219 from the projections 221 of pole pieces and from the rest of the pole piece as shown in FIG. 21A and are spaced from the magnetically conductive enclosure.

Non-magnetic shields 220 essentially separate each pole piece 218 into three segments of magnetically conductive material separated by two shields of non-magnetically conductive material. Consequently, magnetic flux lines from one pole of permanent magnets 219 are forced to spread out to the tips of pole pieces 218 rather than "short circuiting" or returning by the shortest magnetic path 222 through adjacent laminations of the pole pieces to the magnets opposite pole. Thus, non-magnetic shields 220 interrupt the shortest magnetic path 222 through pole pieces 218 by presenting a higher magnetic reluctance to the magnetic force field lines than does the desired path. The desired path is out from the inside faces 227 of permanent magnets 219 and to the tip of the pole pieces, then down through the iron of the armature in a ram horn shape and back to the opposite poles on the inside faces 227 of the adjacent pole pieces on either side. The flux lines originating at the outside faces 223 of permanent magnets 219 pass through the soft iron motor casing (273 in FIG. 20) in a ram horn shape to the opposite magnetic poles at outside faces 223 of adjacent pole pieces.

Figure 22C:
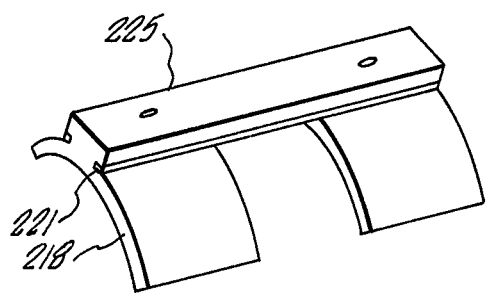
FIG. 22C is a perspective view of the pole piece with a slot cut therein for receiving a cylindrically shaped permanent magnet.

Referring now to FIGS. 22 and 22C, the preferred embodiment of the modified pole piece is shown. A slot 224 is cut in the pole piece 218 and a laminated or solid soft iron backing block is attached to the pole piece to give it additional strength. Referring now to FIGS. 22A and B, the magnetic material is formed into a cylindrical shape. It is then segmented and individually magnetized as shown in FIG. 22A, or portions of the cylinder are magnetized with unmagnetized sections between them as shown in FIG. 22B. Magnetization of the cylinder segments or cylinder is oriented such that the inside faces 227 that are diagonally opposite each other have the same magnetic polarity. Referring again to FIG. 22, the magnetized segments or cylinder permanent magnet 219 are then press fitted or otherwise suitably secured in slot 224 (FIG. 22b) with non magnetic shield material 220 between the permanent magnets 219 and pole pieces 218. As in the other embodiments, the start field windings fit over the projections 221 and backing plate of pole pieces 218.

With the complexity of the vehicles control and propulsion systems comes a procedure for changeover from heat engine to electric drive and vice versa which may be too complicated or difficult to remember for the average driver. Accordingly, a simplified changeover system has been incorporated to minimize this difficulty.

Referring now to FIGS. 6 and 16, an embodiment of such a changeover system for reducing the number of steps in changing from electric drive to heat engine drive is shown. When the driver switches mode switch 19, now DPDT rather than SPST as in FIG. 6, to the GAS position, a 12 volt signal from auxiliary battery 84 via ignition key switch 21 is applied to push button switch 228 in shift lever 17. Push button switch 228 is closed when depressed. It also will not allow shift lever 17 controlling transaxle 15 to be put in gear until the push button is depressed.

When the vehicle is travelling above a certain speed, the heat engine can be started simply by depressing manual clutch 16, putting transaxle 15 into third or fourth gear and releasing manual clutch 16. This embodiment takes care of the clutch manipulation automatically. When the driver depresses push button switch 228 in preparing to place transaxle 15 into gear, the auxiliary battery voltage is applied to servo actuator 229 via mode switch 19 and ignition key switch 21 in FIG. 6A. When servo actuator 229 is energized, it pushes or pulls manual clutch 16 in disengaging it. After transaxle 15 is put in gear, push button switch 228 is released opening the circuit energizing servo actuator 229. Manual clutch 16 is released starting heat engine 14 when push button 228 is released.

Referring now to FIGS. 6A, B and 17, another embodiment of the changeover system is shown. When ignition key switch 21 is switched to IGNITION wiper 230 of relay 231 is energized from auxiliary battery 84. Relay 231 closes contacts 230 when energized by a sufficiently high voltage from tachometer 9 in FIG. 6B along lines 231 and 232. When the voltage from tachometer 9 rises above the breakdown voltage of zener diode 233 indicating the vehicle is travelling at some predetermined speed, relay 231 is energized and the auxiliary battery voltage is applied through normally closed switches 234 and 235 to servo actuator 229. Again servo actuator 229 when energized pushes or pulls mechanical clutch 16 in thereby disengaging it. When shift lever 17 is moved to either the third or fourth gear position, either switch 235 or 234 is opened de-energizing servo actuator 229 thereby releasing mechanical clutch 16 and starting the heat engine.

Figure 18A:
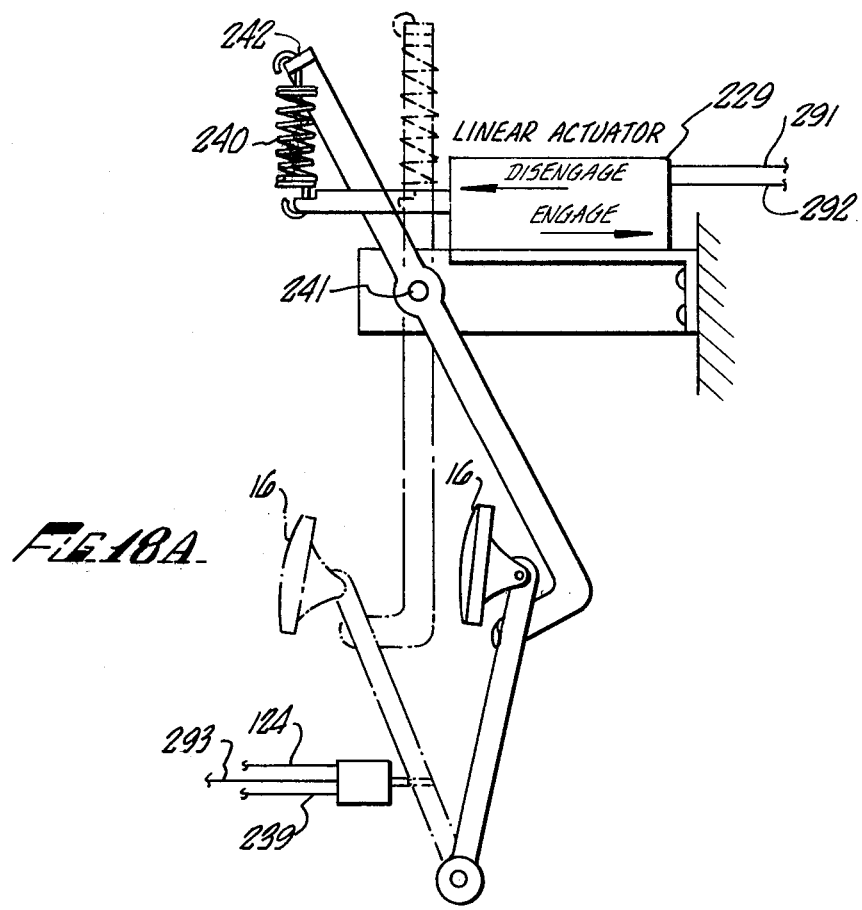
FIGS. 18 and 18A show the preferred embodiment of the changeover system.
Figure 18:
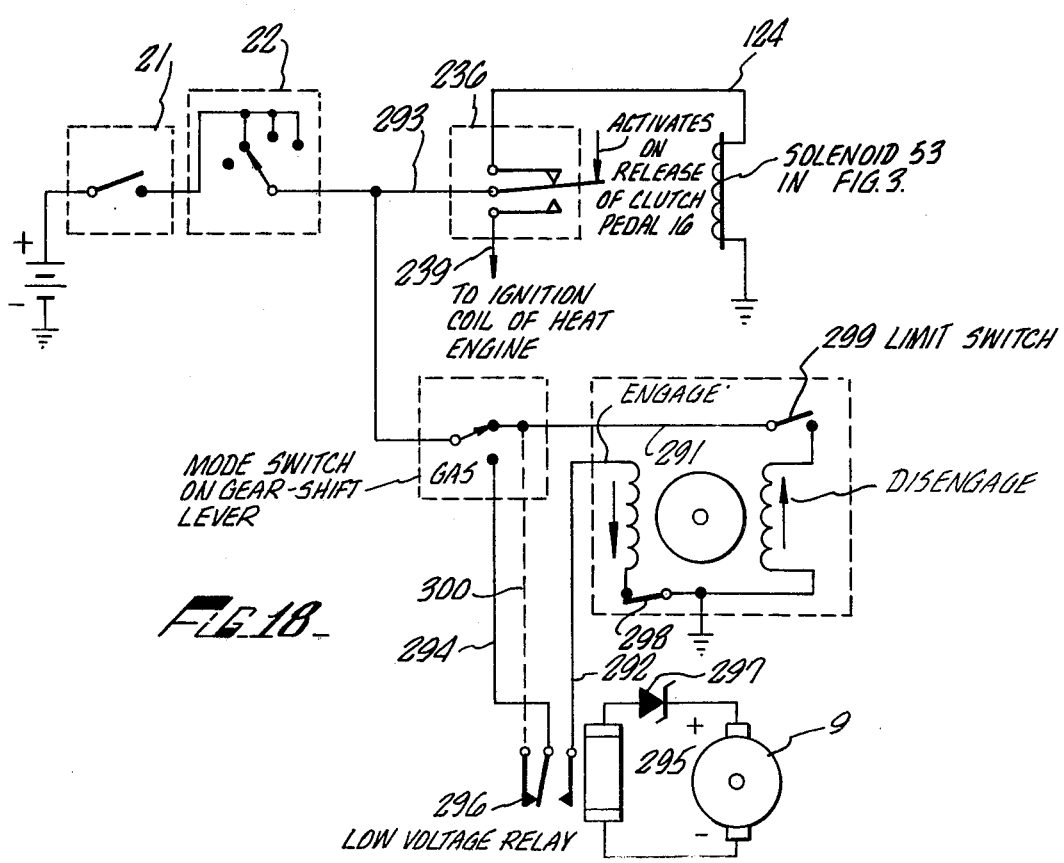

In FIGS. 18 and 18A, the preferred embodiment of the changeover system is shown. In this embodiment, the mechanical clutch pedal 16 determines what mode the vehicle is operating in. A SPDT mode selection switch 236 replaces mode switch 19 in FIG. 6A. Mode selection switch 236 is actuated by the operation of mechanical clutch pedal 16. The single pole of mode selection switch 236 is energized along line 293 from auxiliary battery 84 through ignition key switch 21 and a section of direction selection switch 21. When mechanical clutch 16 is depressed, mode selection switch 19 energizes solenoid 53 in FIG. 4 along line 124 and de-energizes the ignition of the heat engine. In this manner, the powerplant speed control system (20 in FIGS. 2, 3, 4 and 6A) is placed in the electric drive configuration of FIG. 4 where accelerator pedal 18 controls the devices detailed earlier.

When mechanical clutch 16 is engaged, mode selection switch 236 de-energizes solenoid 53 in FIG. 4 and energizes the heat engine ignition along line 239. Mechanical clutch 16 can be depressed either by a spring, or by a servo actuator or by a combination of a spring and servo or manually. In the embodiment shown in FIG. 18A, mechanical clutch 16 is operated by a combination of a spring 240 and a linear servo actuator 229. Clutch pedal 16 pivots at fulcrum 241 and is attached to spring 240 at point 242. The other end of spring 240 is attached to servo actuator 229. Servo actuator 229 has a first input 291 and a second input 292. When the first input of servo actuator 229 is energized, it assumes the position shown in solid lines on FIG. 18A. In this position, clutch 16 is disengaged, and switch 236 places the vehicle in electric drive by energizing solenoid 53 in FIG. 3 along line 124. However, when the second input of linear servo actuator 229 is energized, the actuator 229 assumes the position shown in phantom on FIG. 18A. Clutch 16 is then engaged and switch 236 senses this condition and places the vehicle in heat engine drive by energizing the ignition of the heat engine along line 239.

The first and second inputs of linear actuator 229 are energized as shown in FIG. 18. Mode select switch 19 is mounted on gear shift lever 17 in this embodiment and has a GAS and ELECTRIC position. Mode select switch no longer directly controls solenoid 53 in the powerplant speed control system but controls linear servo actuator 229 instead. In the ELECTRIC position, mode switch 19 energizes first input 291 of linear servo actuator 229 causing it to disengage clutch 16 by assuming the position shown in solid lines in FIG. 18A. When mode switch 19 is moved to the GAS position, line 294 to the wiper of relay 295 is energized. Relay 295 is connected to the output of a device such as tachometer 9 in FIG. 6B which generates a D.C. voltage proportional to the speed of the vehicle. When the speed reaches the predetermined level set by the breakdown voltage of zener diode 297 and the output characteristics of the speed sensing device, relay 295 is energized and its wiper makes contact with the contact connected to second input 292 energizing it. Linear servo actuator 229 then begins to move toward the position shown in phantom in FIG. 18A and stops there when limit switch 298 opens the circuit path. A similar limit switch 299 opens the circuit of the first input of linear servo actuator 229 when the first input is energized and the servo reaches the position of full disengagement of clutch 16.

The purpose of the combination of tachometer 9, zener diode 297 and relay 295 is to prevent engagement of clutch 16 when mode switch 19 is moved to the GAS position when the vehicle is travelling below the predetermined speed, a speed which would be too low to convert to heat engine drive. Placing zener diode 297 in series with the coil of relay 295 acts to eliminate the effect of hysteresis in the coil of relay 295 which would tend to make the relay "drop-out" voltage lower than the relay "pull-in" voltage. Virtual elimination of this hysteresis effect is accomplished by using a zener diode with a breakdown voltage substantially higher than either the "pull-in" or "drop-out" voltage of the relay coil. For example, if the relay pulls in at 1 volt and drops out at ⅓ of a volt across its coil, a 9 volt zener diode in series with the coil would result in a total pull in voltage of 10 volts and a total drop-out voltage of 9⅓ volts. The effect is to diminish the significance of the difference in coil voltage at pull-in and drop-out in relation to the total voltage across the zener-coil combination at pull-in and drop-out. The result is pull-in and drop-out of relay 295 at roughly the same vehicle speed whether the vehicle has been accelerating or decelerating.

Figure 24:
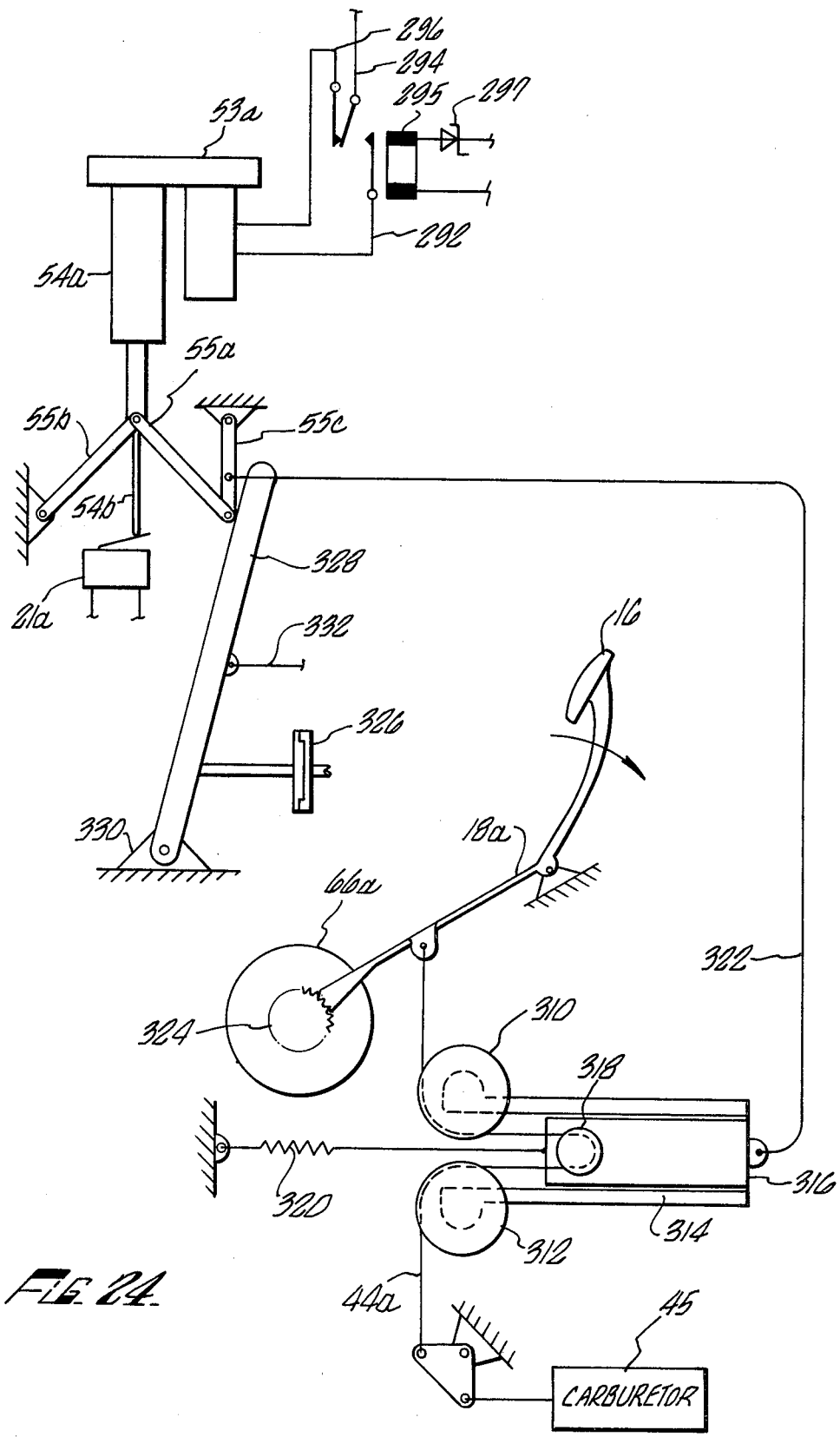
FIG. 24 is an alternate accelerator arrangement illustrated schematically.

Another embodiment of the change over system is illustrated in FIG. 24. In this embodiment, the actuator 53a is pivotally mounted with the screw piston 54a extending to actuate links 55a, 55b and 55c. Links 55a and 55b are pivotally attached to the piston 54a and extend at angles to the direction of piston movement such that the V formed becomes wider as the piston moves down. Link 55b is pivotally attached at a second end to the vehicle frame. Therefore, the second end of link 55b moves outwardly as the piston 54a moves down. Link 55c is pivotally attached to the vehicle frame and the end of link 55a to ensure movement of link 55a in an outwardly direction.

The piston 54a includes an extension 54b which activates an ignition switch 21a. The ignition switch is closed by the piston extension 54b being retracted toward the actuator.

The accelerator pedal 18a of the embodiment of FIG. 24 is attached to the fuel metering device 45 via a cable 44a. The cable 44a is associated with a linkage enablement system including a pair of pulleys 310 and 312 about which the cable 44a extends. The pulleys 310 and 312 are fixed relative to the frame of the vehicle as is a guide bushing 314 which includes a bore aligned in a direction to go between the pulleys 310 and 312. A carriage 316 is positioned in the bushing 314 to slide toward and away from the pulleys 310 and 312. The carriage 316 supports a pin or pulley 318 about which the cable 44a is threaded. As the carriage 316 moves toward the pulleys 310 and 312, the cable 44a exhibits sufficient slack so that the accelerator pedal 18a has no effect on the fuel metering device 45. As the carriage 316 moves to the right, the accelerator pedal 18a is enabled.

Control of the carriage location is determined by a biasing spring 320 and a control cable 322. The spring 320 biases the carriage 316 toward the pulleys 310 and 312 while the control cable 322 is capable of forcing the carriage 316 to the right, away from the pulleys 310 and 312.

The accelerator pedal 18a also controls the position of a potentiometer 66a by means of a rack and pinion arrangement 324. The accelerator pedal 18a is pivotally fixed relative to the frame of the vehicle at 46a. The potentiometer 66a would be redirected by electrical means when the selected operating mode of the vehicle is heat engine only.

To operatively associate the above described assemblies with one another and with the clutch 326 and the clutch pedal 16, a lever 328 has been employed. The lever 328 is pivotally fixed relative to the frame of the vehicle at 330. The lever 328 is positioned to be forceably rotated by the link 55a when the solenoid 53a is extended. The control cable 322 is fixed to the link 55c to move with the solenoid linkage and the lever 328. As the solenoid 53a is extended, the accelerator linkage cable 44a is slackened. The lever 328 is also positioned to disengage the clutch 326 as the solenoid 53a is extended. A clutch linkage cable 332 is tied to the lever such that depression of the clutch pedal 16 will result in disengagement of the clutch 326.

The operation of the powerplant speed control system in summary is that the solenoid position is selected to give heat engine usage. The solenoid 53a is not extended. Therefore, the ignition switch is closed and the lever 328 is pivoted to the left. The clutch 326 is engaged unless the clutch pedal 16 is depressed. The carriage 316 is to the right and the accelerator linkage cable 44a enables the accelerator pedal to actuate the carburetor 45. The potentiometer is electrically off.

When the electric mode is selected, the solenoid piston 54a is extended to open the ignition switch 21a and move the lever 328 to the right as seen in FIG. 24. This mode results in the disablement of the accelerator cable 44a and the disengagement of the clutch 326. The potentiometer 66a is electrically activated to control motor speed.

This same effect has been incorporated in the overdrive system (30 in FIG. 2) discussed herein for causing relays 189 and 190 in the embodiment shown in FIGS. 6B and C to "pull-in" and "drop-out" at approximately the same vehicle speed whether the vehicle has been accelerating or decelerating. Zener diodes 187 and 188 serve to provide this effect.

As mentioned earlier, the uneven radii of turning causes undesirable loading while the vehicle is turning in electric motors 1 and the mechanical gears 3, shafts 7, and electric clutches 2 associated therewith. To eliminate this effect a differential turn system 132 is incorporated in the control input circuit of power controller 13. Referring now to FIGS. 10, 11 and 6A, B, C, differential turn switch 132 is mounted at the front of the car with its operating lever actuated by two prongs 243 attached to steering gear tie rod 244. When front wheels 5A are turned, one of prongs 243 gives a turn signal by operating differential turn switch 132 causing normally closed contacts 131 to open. Resistor 247 is then no longer shorted out by lines 245 and 246 and is inserted in series with potentiometer 66 of powerplant speed control system 20 in FIG. 6A. Therefore, the control voltage sent to power controller 13 along line 76 from the wiper of potentiometer 66 is diminished by the additional voltage dividing effect caused by resistor 247. In this manner, the average power being fed to both motors is reduced simultaneously thereby preventing overheating of the motor on the rear wheel of the smaller radius turn. This is the preferred embodiment of this system.

Another embodiment is shown in FIG. 12. There power controller 13 is shown to have a resistance capacitance frequency determining network connected to terminals 248 and 249 comprised of capacitor 250 and resistors 251 and 252. When differential turn switch 132 is operated contacts 131 open the resistor 252 is removed from its parallel connection across resistor 251. The change in resulting resistance lowers the frequency of power controller 13 thereby lowering the average power fed to both electric motors 1. Relief is afforded in this manner to the motor driving the rear inside wheel which otherwise is turning too slowly for the power being fed to it.

Figure 13:
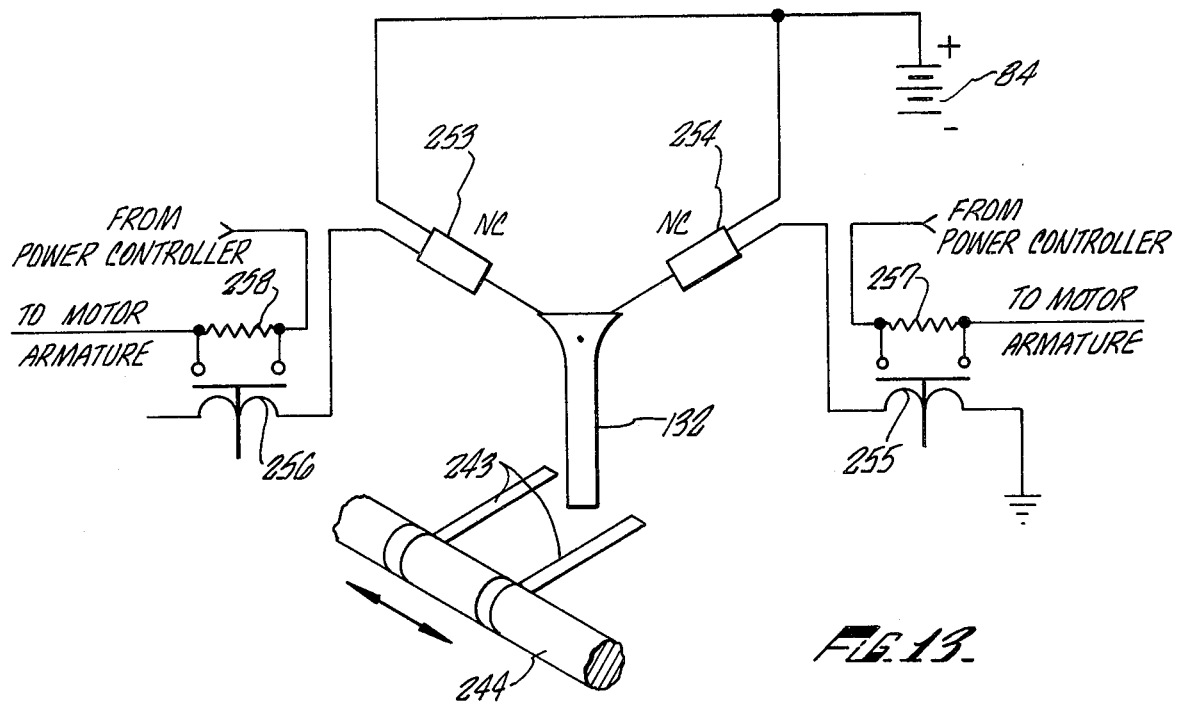
FIG. 13 is a diagram of another embodiment of the differential turn system which adjusts armature current in either motor.

Yet another embodiment of this differential turn system is shown in FIG. 13. There differential turn switch 132 operates two sets of contacts 253 and 254 which are connected between auxiliary battery 84 and the coils of a pair of contactors 255 and 256. The power terminals of these contactors are connected to transmit chopped power around series resistors 257 and 258 to motor armatures 1A. When either contact 253 or 254 opens, the respective contactor is de-energized and the chopped power for that particular motor armature is forced to pass through either resistor 257 or 258. Thus armature current in the motor on the inside of the turn is reduced and loading therein is minimized.

Figure 14:
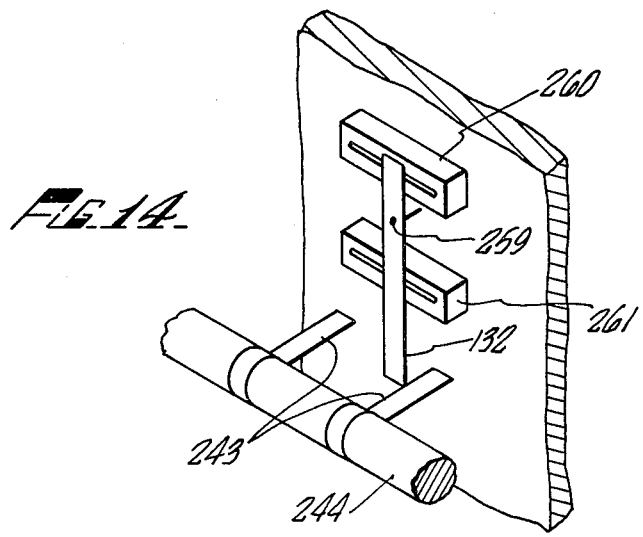
FIGS. 14 and 14A are diagrams of another embodiment of the differential turn system using individual power controllers.
Figure 14A:
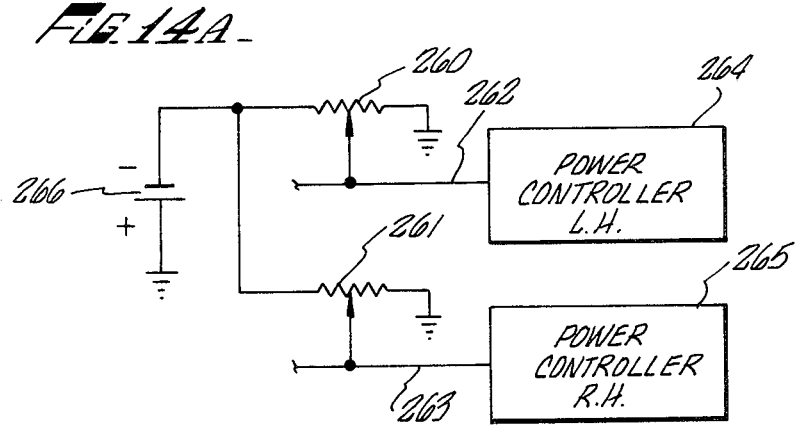

Another embodiment of the differential turn system is shown in FIG. 14. In this version, differential turn switch pivots at 259 and operates potentiometers 260 and 261 in opposite directions for a given turn. These potentiometers individually control separate power controllers 13 each driving one of the electric motors. Potentiometers 260 and 261 each divide off a portion of a negative supply voltage from D.C. power source 266 and apply it to control inputs 262 and 263 in opposition to the +0-5 volt control voltage normally present there. The result is a decreasing pulse width to the inside motor as the potentiometer for the particular direction of turn applies an increasingly negative control voltage to its power controller.

Figure 15:
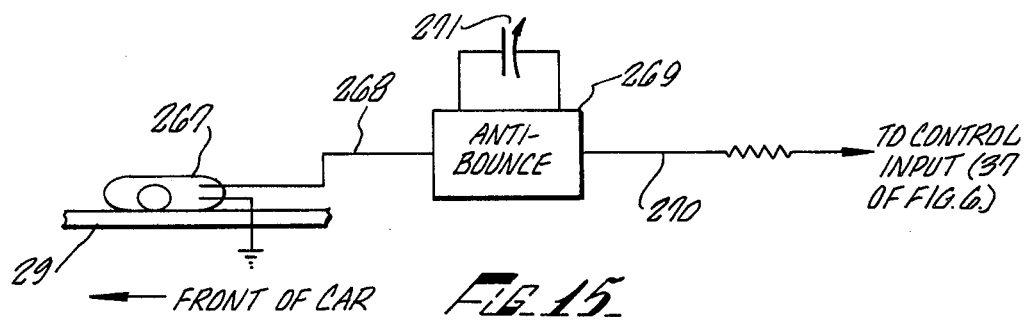
FIG. 15 is a diagram of the hill sensing system.

Charging the main battery 12 can impose a considerable mechanical load on rear wheels 5 in heat engine drive. To prevent excessive loading of the heat engine when attempting to accelerate or climb a hill, a hill sensing and acceleration system is employed. Turning to FIG. 15, mercury switch 267 is attached to car frame 29. When the car accelerates or is climbing a hill, the mercury in switch 267 moves to the rear and grounds first output line 268. A time delay circuit 269 eliminates spurious grounding on first output line 268 for short periods of time from being reflected in a second ouput line 270. This time delay circuit may be a Motorola MC 14490 anti-bounce chip. Capacitor 271 allows adjustment of the time delay. When line 268 is grounded for a time caused by a sustained acceleration or hill climb, output line 270 is grounded. Output line 270 is connected to control input 37 in FIG. 6 and effectively reduces the control signal there to zero volts thereby stopping charging and relieving mechanical loading of rear wheels 5.

Although the invention has been described in terms of the specific embodiments disclosed herein, other embodiments incorporating the principles and performing the same functions as the invention disclosed herein are intended to be included within the scope of the claims.

What is claimed:

1. A vehicle comprising
   a supporting structure having wheels rotatably mounted relative to said supporting structure;
   a heat engine mounted on said supporting structure for driving at least a first said wheel, and having a fuel metering device;
   a battery powered electric motor mounted on said supporting structure for driving at least a second said wheel, said electric motor having an armature winding;
   means for controlling average power flowing through said armature winding and having a control input and power terminals through which the current in said armature winding flows responsive to a control signal at said control input;
   a mode select input;
   means for heat engine and electric motor speed control having a single accelerator pedal for alternately controlling either said fuel metering device or said control signal at said control input in accordance with a signal at said mode select input; and
   a mode selection means for selecting which of said fuel metering device or said control signal said means for heat engine and electric motor speed control is to control and for sending said signal to said mode select input.

2. The vehicle of claim 1 wherein said means for heat engine and electric motor speed control further include a cable linkage between said single accelerator pedal and said fuel metering device, said cable linkage including a length of cable creating a slack cable linkage between said single accelerator pedal and said fuel metering device, and means for tensioning said cable linkage to remove said slack.

3. The vehicle of claim 2 wherein said means tensioning said cable includes a movable carriage having a pulley associated with said cable to effectively lengthen the guided path of said cable.

4. The vehicle of claim 1 wherein said means for heat engine and electric motor speed control include a potentiometer driven by said single accelerator pedal, said potentiometer being selectively electrically activated by said mode select input.

5. The vehicle of claim 1 wherein said mode select input includes an actuator and linkage, the vehicle further comprising a clutch associated with said heat engine and an ignition switch associated with said heat engine, said linkage being associated with said ignition switch, said clutch, and said single accelerator pedal such that said clutch is disengaged, said ignition switch is open and said single accelerator pedal is disabled with said fuel metering device in a first position and said ignition switch is closed, said clutch is engaged and said single accelerator pedal is enabled with said fuel metering device in a second position, and means for electrically redirecting said control input when said linkage is in said second position.

6. The vehicle of claim 5 further including
   a motor clutch for selectively engaging said motor with at least said second said wheel;
   means for sensing the speed of said second said wheel and for producing a wheel speed signal responsive thereto;
   means for sensing the speed of said motor and for producing a motor speed signal responsive thereto; and
   comparator means for sensing said wheel speed signal and said motor speed signal to determine when the speed of the motor side of said motor clutch and the speed of the wheel side of said motor clutch are substantially equal, said comparator means producing a signal enabling engagement of said motor when said speeds are substantially equal.

7. The vehicle of claim 1 wherein said means for heat engine and electric motor speed control includes a linkage pivotally and slideably mounted relative to said supporting structure such that a first end of said linkage is coupled with said single accelerator pedal throughout its arc of pivotal movement, said fuel metering device being positioned to encounter said linkage with said linkage at a first end of said arc and said control input being positioned to encounter said linkage with said linkage at the other end of said arc, said means for heat engine and electric motor speed control further including means for selectively pivoting said linkage to said first and second ends of said arc.

8. The vehicle of claim 1 wherein said control input includes a gradient tint mask coupled with said single accelerator pedal, a light source and a photoelectric cell, said photoelectric cell providing the control voltage for said means for controlling average power, said gradient tint mask slideably extending to and between said light source and said photoelectric cell for selectively variable transmission of light from said light source to said photoelectric cell.

9. A vehicle comprising
a supporting structure having wheels rotatably mounted relative to said supporting structure;
a heat engine mounted on said supporting structure for driving at least a first wheel;
a battery powered electric motor mounted on said supporting structure for driving at least a second said wheel, said electric motor having an armature winding and at least two magnetic fields through which said armature winding rotates, at least one of said magnetic fields being created by a permanent magnet, another of said at least two magnetic fields being created by a field winding;
means for controlling the magnetic field produced by said field winding by reducing the current in said field winding at increased vehicle speed; and
means for controlling average power flowing through said armature winding by chopping and having a control input and power terminals through which the current in said armature winding flows responsive to a control signal at said control input.

10. The vehicle of claim 9 wherein said electric motor further includes
a pole piece with a recess formed therein, said pole piece being of a magnetically conductive material;
a permanent magnet formed in the same shape and size as said recess and inset therein for generating a magnetic field in said pole piece and through said armature winding;
shielding formed of non-magnetic material inserted between said permanent magnet and said pole piece for preventing the magnetic flux lines from one pole of said permanent magnet from taking the shortest path of least magnetic reluctance back to the opposite pole of said permanent magnet and forcing the magnetic flux to spread out to the extremities of said pole piece; and
a start field winding wrapped about said pole piece with said permanent magnet inset for creating a second magnetic field in said pole piece and through said armature winding when current is passed through said start field winding.

11. The vehicle of claim 10 wherein said motor includes multiple pole pieces and wherein at least two said permanent magnets are inserted in recesses located at opposite extremities of said pole pieces.

12. The vehicle of claim 10 wherein said recess in said pole piece is a slot through the center of said pole piece separating said pole piece into segments, the long axis of said slot being parallel to the direction of rotation of said armature winding and where said permanent magnet is formed in the shape of a cylinder of the same approximate width and length as said slot, said permanent magnet inserted and affixed therein and a non-magnetic shield material located between said permanent magnet and the wall of said slot.

13. The vehicle of claim 9 wherein said field winding is a shunt wound field winding, said other of said at least two magnetic fields being caused by the flow of current through said field winding and said means for controlling the magnetic field produced by said field winding includes overdrive means for overdrive by reducing the current flowing through said field winding as motor speed increases, said current being reduced to zero by said overdrive means at a predetermined speed.

14. The vehicle of claim 13 wherein said means for overdrive includes
means for sensing vehicle speed, said means including signal generating means proportional to said vehicle speed;
means for sensing said speed signal and generating a first trigger signal when said speed signal exceeds a preselected level; and
means responsive to said trigger signal for interrupting the path of current through said start field winding.

15. A vehicle comprising
a supporting structure having wheels rotatably mounted relative to said supporting structure;
a heat engine mounted on said supporting structure for driving at least a first wheel;
a battery powered electric motor mounted on said supporting structure for driving at least a second said wheel, said electric motor having an armature winding and at least one shunt wound field winding for a magnetic field through which said armature winding rotates;
means for sensing vehicle speed including means for generating a speed signal responsive to vehicle speed;
means for controlling current to said shunt wound field winding including a chopper responsive to said speed signal to reduce current with increased vehicle speed; and
means for providing at least a minimum of current in said shunt wound field winding at increased vehicle speed.

16. A vehicle comprising
a supporting structure having a plurality of wheels rotatably mounted relative to said supporting structure;
a heat engine mounted on said supporting structure for driving at least a first said wheel;
a battery powered electric motor mounted on said supporting structure for driving at least a second said wheel, said electric motor having an armature winding and a magnetic field through which said armature winding rotates;
a main battery mounted on said supporting structure for applying power to said electric motor;
a means for sensing the vehicle speed and for generating a DC signal proportional to said speed;
a means for charge rate selection including an operator control transducer for producing a first control signal in proportion to the setting selected by the operator and an operator control means for producing an offset signal of opposite polarity from said first control signal electrically responsive to said means for sensing vehicle speed and mechanically responsive to the movement of said operator controlled transducer such that the offset signal varies both with the rotational speed of said armature winding and with the operator's selected rate of charge; and
means for summing said first control signal and said offset signal so that the resultant control signal varies inversely and in predetermined proportion to the power output from said armature winding as said power output varies with changing vehicle speed to maintain a substantially constant charging rate at said main battery when said motor-generator is in the generating mode.

17. A vehicle comprising a supporting structure having a plurality of wheels rotatably mounted relative to said supporting structure;

a heat engine mounted on said supporting structure for driving at least a first said wheel and having a fuel metering device;

an electric motor mounted on said supporting structure for driving at least a second said wheel and being driven by said wheel, said electric motor having an armature winding and at least two magnetic fields through which said armature winding rotates, at least one of said magnetic fields being created by a permanent magnet, and said electric motor acting as a generator driven by said wheel when desired by the vehicle operation;

a main battery mounted on said supporting structure for supplying power to said electric motor;

an inductor electrically connected to said armature winding for stepping up the output voltage therefrom above the main battery voltage at substantially all rotational speeds of said armature winding when said electric motor is acting as a generator;

a means for controlling power by chopping having power terminals and a control input for controlling the average power entering or leaving said armature winding through said power terminals in proportion to a control signal at said control input;

means for switching the connections of said power terminals from controlling power flowing from said main battery through said inductor and into said armature winding in an electric drive configuration to controlling power flowing out of said armature winding through said inductor and into said main battery in a battery charging configuration, said means for switching being connected between said inductor and armature winding on one side and said power terminals and said main battery on the other side and having an input for receiving a signal causing said switching to occur;

a means for power plant speed control having a single accelerator pedal for alternately controlling either said fuel metering device or the control signal at said control input of said means for controlling power, but not both simultaneously, and having a mode select input for receiving a signal indicating which device is to be controlled, and for directing a signal to said input for said means for switching for causing it to switch to the battery charging configuration when said accelerator pedal is undepressed or when said fuel metering device is being controlled and to switch to the electric drive configuration when the accelerator pedal is depressed and control of said means for controlling power has been selected as indicated by the signal at said mode select input and having a means for electrically interlocking;

a mode switch for selecting which device said means for power plant speed control controls and for sending a signal to said mode select input of said means for power plant speed control;

a mechanical braking system connected to said wheels and having a brake pedal;

a means for regenerative braking mechanically connected to said brake pedal and electrically interlocked with said means for electrically interlocking in said means for power plant speed control for sensing when said accelerator pedal is undepressed or when said vehicle is in heat engine drive and for sensing pressure on said brake pedal and the amount thereof, and when these conditions are met, for sending a control signal to said control input of said means for controlling power to increase the charging rate in proportion to increasing braking pressure for causing increasing mechanical load on the wheel driving said electric motor and having a second means for interlocking; and means for charging said main battery at a substantially constant, operator selected rate of power from energy derived from said electric motor and electrically interlocked with said means for electrically interlocking in said means for power plant speed control and with said second means for electrically interlocking in said means for regenerative braking for controlling the signal at said control input in such a manner that the average rate of power flowing into said main battery remains constant over a range of vehicle speeds when said means for switching is in the battery charging configuration and said brake pedal is undepressed.

18. The vehicle of claim 17 further including a voltage sensing means for sensing the main battery voltage; and means for substantially reducing the charging rate to said main battery when the main battery voltage exceeds a first predetermined level and regaining the initial charging rate when the main battery voltage reaches a second predetermined level below said first predetermined level.

* * * * *